United States Patent
Drazek et al.

(10) Patent No.: US 12,467,852 B2
(45) Date of Patent: Nov. 11, 2025

(54) METHODS AND SYSTEMS FOR MANUFACTURING A PRODUCTION ASSAY REACTOR

(71) Applicants: BIOMÉRIEUX, Marcy l'Etoile (FR); UNIVERSITE CLAUDE BERNARD LYON I, Villeurbanne (FR); CENTRE NATIONAL DE LA RECHERCHE SCIENTIFIQUE, Paris (FR)

(72) Inventors: Laurent Drazek, Grenoble (FR); Christian Jallut, Vaulx-en-velin (FR); Isabelle Pitault, Saint-Genis-Laval (FR); Maëlenn Robin, Lyons (FR); Mélaz Tayakout-Fayolle, Lyons (FR)

(73) Assignees: BIOMÉRIEUX, Marcy l'Etoile (FR); UNIVERSITE CLAUDE BERNARD LYON I, Villeurbanne (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 947 days.

(21) Appl. No.: 17/610,248

(22) PCT Filed: May 22, 2019

(86) PCT No.: PCT/IB2019/000561
§ 371 (c)(1),
(2) Date: Nov. 10, 2021

(87) PCT Pub. No.: WO2020/234617
PCT Pub. Date: Nov. 26, 2020

(65) Prior Publication Data
US 2022/0244171 A1    Aug. 4, 2022

(51) Int. Cl.
*G01N 21/27*    (2006.01)
*G01N 21/552*   (2014.01)
(Continued)

(52) U.S. Cl.
CPC ......... *G01N 21/274* (2013.01); *G01N 21/272* (2013.01); *G01N 21/553* (2013.01);
(Continued)

(58) Field of Classification Search
None
See application file for complete search history.

(56) References Cited

U.S. PATENT DOCUMENTS 5,639,668 A    6/1997 Neel et al.
5,757,013 A    5/1998 Groger et al.
(Continued)

FOREIGN PATENT DOCUMENTS

EP    0 241 268 A2    10/1987
EP    0 802 413 A2    10/1997
(Continued)

OTHER PUBLICATIONS

International Search Report, dated Sep. 10, 2020, corresponding to International Application No. PCT/IB2019/000561.
(Continued)

*Primary Examiner* — Brian R Gordon
(74) *Attorney, Agent, or Firm* — LADAS & PARRY LLP; Malcolm J. MacDonald, Esq.

(57) ABSTRACT

A method and system for measuring values of one or several characterizing parameters representative of the kinetics of an assay chemical reaction, including: providing a calibration tool having a reaction chamber; for a given set of defining features, performing a series of calibration experiments under different sets of calibration values of at least one operating parameter; providing a digital calibration model representative of the kinetics of the assay chemical reaction in the calibration tool, where the assay digital calibration model includes one or several characterizing parameters, the values of which have a dependency on the given set of
(Continued)

defining features used for the calibration experiments; fitting, by computation, the values of the characterizing parameters for the given set of defining features, based on the series of calibration experiment results; and where the reaction chamber is a stirred-tank reactor.

15 Claims, 10 Drawing Sheets

(51) Int. Cl.
    *G01N 33/543*     (2006.01)
    *G01N 33/58*     (2006.01)
    *G16C 20/10*     (2019.01)
(52) U.S. Cl.
    CPC ..... *G01N 33/54366* (2013.01); *G01N 33/585* (2013.01); *G16C 20/10* (2019.02)

(56) References Cited

U.S. PATENT DOCUMENTS

| | | | |
|---|---|---|---|
| 6,144,455 A | | 11/2000 | Tuunanen et al. |
| 2001/0021534 A1 | | 9/2001 | Wohlstadter et al. |
| 2002/0187513 A1 | | 12/2002 | Kopf-Sill et al. |
| 2004/0005582 A1* | 1/2004 | Shipwash | G01N 33/54366 435/7.1 |
| 2004/0132215 A1 | | 7/2004 | Lackie et al. |
| 2005/0142033 A1* | 6/2005 | Glezer | B01L 3/5085 422/400 |
| 2005/0278057 A1 | | 12/2005 | Cooperberg et al. |
| 2006/0264779 A1* | 11/2006 | Kemp | A61B 5/1427 600/583 |
| 2007/0117214 A1 | | 5/2007 | Masters et al. |
| 2007/0239380 A1* | 10/2007 | Miles | G01N 21/274 702/85 |
| 2008/0052024 A1* | 2/2008 | Tracy | G01N 21/553 702/85 |
| 2010/0075407 A1* | 3/2010 | Duffy | G01N 33/54313 435/7.92 |
| 2010/0075862 A1* | 3/2010 | Duffy | G01N 33/54366 506/13 |
| 2010/0099097 A1* | 4/2010 | Jonsmann | B01L 3/5027 435/7.1 |
| 2010/0267049 A1* | 10/2010 | Rutter | G01N 21/6428 435/7.1 |
| 2010/0285989 A1* | 11/2010 | Huo | G01N 33/54346 506/9 |
| 2011/0212848 A1* | 9/2011 | Duffy | G01N 33/54313 506/15 |
| 2013/0122606 A1 | | 5/2013 | Cerrato et al. |
| 2014/0141529 A1 | | 5/2014 | Karlsson et al. |
| 2014/0220580 A1 | | 8/2014 | Brown et al. |
| 2014/0274805 A1 | | 9/2014 | Wohlstadter et al. |

FOREIGN PATENT DOCUMENTS

| | | |
|---|---|---|
| FR | 2 417 094 | 9/1979 |
| WO | 2004/055502 A2 | 7/2004 |
| WO | 2004109284 A1 | 12/2004 |
| WO | 2013/052318 A1 | 4/2013 |

OTHER PUBLICATIONS

Morton et al., 1995: Morton, T., Myszka, D., and Chaiken, I. (1995), "Interpreting Complex Binding Kinetics from Optical Biosensors: A Comparison of Analysis by Linearization, the Integrated Rate Equation, and Numerical Integration", Analytical Biochemistry, 227(1):176-185.
Karlsson et al., 1991: Karlsson, R., Michaelsson, A., and Mattsson, L. (1991), "Kinetic analysis of monoclonal antibody-antigen interactions with a new biosensor based analytical system", Journal of Immunological Methods, 145(1-2):229-240.
Voss, 1993 : Voss, E. W. (1993), "Kinetic measurements of molecular interactions by spectrofluorometry", Journal of Molecular Recognition, 6(2):51-58.
Renard et al., 1995: Renard, J., Vidal-Madjar, C., and Lapresle, C. (1995). « Determination by Chromatographic Methods of the Adsorption Rate Constant of HSA on Immobilized Polyclonal and Monoclonal Antibodies, Journal of Colloid and Interface Science, 174(1):61-67.
Bongrand, 1999: Bongrand, P. (1999), "Ligand-receptor interactions" Reports on Progress in Physics, 62(6):921-968.
Schräml and von Proff, 2012: Schräml, M. and von Proff, L. (2012), "Temperature-Dependent Antibody Kinetics as a Tool in Antibody Lead Selection", In Proetzel, G. and Ebersbach, H., editors, Antibody Methods and Protocols, vol. 901, pp. 183194, Humana Press, Totowa, NJ.
Chang et al., 2012: Chang, L., Rissin, D. M., Fournier, D. R., Piech, T., Patel, P. P., Wilson, D. H., and Duffy, D. C. (2012), "Single molecule enzyme-linked immunosorbent assays: Theoretical considerations", Journal of Immunological Methods, 378(1-2):102115.
Dinh et al., 2016: Dinh, T. L., Ngan, K. C., Shoemaker, C. B., and Walt, D. R. (2016), "Using Antigen-antibody Binding Kinetic Parameters to Understand Single-Molecule Array Immunoassay Performance", Analytical Chemistry, 88(23):11335-11339.
Myszka, D. G., Morton, T. A., Doyle, M. L., and Chaiken, I. M. (1997), "Kinetic analysis of a protein antigen-antibody interaction limited by mass transport on an optical biosensor", Biophysical Chemistry, 64(1-3):127-137.
Tiwari et al., 2015: Tiwari, P. B., Üren, A., He, J., Darici, Y., and Wang, X. (2015). Note: "Model identification and analysis of bivalent analyte surface plasmon resonance data", Review of Scientific Instruments, 86(10):106107.
Gelinsky-Wersing et al. 2017: Gelinsky-Wersing, D., Wersing, W., and Pompe, W. (2017), "Bivalent kinetic binding model to surface plasmon resonance studies of antigen-antibody displacement reactions", Analytical Biochemistry, 518:110-125.
Karlsson et al., 1994: Karlsson, R., Roos, H., Fägerstam, L., and Persson, B. (1994), "Kinetic and Concentration Analysis Using BIA Technology", Methods, 6(2):99110.
Myszka, 1997: "Kinetic analysis of macromolecular interactions using surface plasmon resonance biosensors", Current Opinion in Biotechnology, 8(1):50-57.
Mao et al., 1991: Mao, Q., Johnston, A., Prince, I., and Hearn, M. (1991), "High-performance liquid chromatography of amino acids, peptides and proteins", Journal of Chromatography A, 548:147-163.
Lee and Chen, 2001: Lee, W.-C. and Chen, C.-H. (2001), "Predicting the elution behavior of proteins in affinity chromatography on non-porous particles", Journal of Biochemical and Biophysical Methods, 49(1-3):63-82.
Chaiken and Chemical Rubber Company, 1987: Chaiken, I. M. and Chemical Rubber Company, editors (1987). Analytical affinity chromatography, CRC Pr, Boca Raton, Fla. OCLC: 246691774.
Sridhar et al., 1994: Sridhar, P., Sastri, N. V. S., Modak, J. M., and Mukherjee, A. K. (1994), "Mathematical simulation of bioseparation in an affinity packed column", Chemical Engineering & Technology, 17(6):422429.
Sandoval et al., 2012: Sandoval, G., Andrews, B. A., and Asenjo, J. A., (2012), "Elution relationships to model affinity chromatography using a general rate model", Journal of Molecular Recognition, 25(11):571579.
de Sousa Junior et al., 2016: de Sousa Junior, F. C., de Araújo Padilha, C. E., Chibério, A. S., Ribeiro, V. T., Martins, D. R. A., de Oliveira, J. A., de Macedo, G. R., and dos Santos, E. S., (2016), "Modeling and simulation of breakthrough curves of recombinant 503 antigen using immobilized metal affinity expanded bed adsorption chromatography", Separation and Purification Technology, 164:3440.
Myszka et al., 1998 : Myszka, D. G., He, X., Dembo, M., Morton, T. A., and Goldstein, B., 1998, "Extending the range of rate

(56) References Cited

OTHER PUBLICATIONS constants available from BIACORE: interpreting mass transport-influenced binding data", Biophysical Journal, 75(2):583-594.

* cited by examiner

METHODS AND SYSTEMS FOR MANUFACTURING A PRODUCTION ASSAY REACTOR

The invention lies within the field of methods and apparatus for manufacturing a production assay reactor, including the measurement of the values of one or several characterizing parameters representative of the kinetics of an assay chemical reaction to be performed in such a production assay reactor.

More specifically, the invention lies within the field of methods and apparatus involving a chemical reaction between a given ligand species, which is coated on a solid surface of a given support material to form thereon a reactive solid surface, and a given analyte species contained in a reaction fluid. In such an assay reaction, the given analyte species is able to bind with a given ligand species according to the assay chemical reaction.

The invention will be hereinafter more specifically described in the context where the assay chemical reaction is or comprises an antigen/antibody interaction. Such assay chemical reaction is typical of the immunoassay technique. It must therefore be understood that, in the context of this application, the term chemical reaction is to be understood as including such antigen and antibody interaction. More broadly, the term chemical reaction is to be understood as including both covalent and non-covalent chemical reactions, including electrostatic interactions, hydrogen bonds, van der Waals forces, hydrophobic interactions, and more generally adsorption processes. Of course any other ligand species useful for the immunoassay technique and immobilized on the reactive solid surface such as antibody fragment, antigen receptor, phage protein, aptamer, and so on, is included within the invention.

An assay chemical reaction is the chemical reaction, within the broad meaning as above, which occurs and is instrumental in an assay. An assay is a procedure for qualitatively assessing or quantitatively measuring the presence, amount or functional activity of a target species. In the context of the invention, the target species can be the analyte species which is able to bind with the ligand species. However, the target species of the assay may be different from the analyte species which is able to bind with the ligand species in the assay chemical reaction involved in that assay. For example, the analyte species may be a product of an intermediate chemical reaction involved in the assay. It may be an antiligand able to bind to the ligand and also to the target species, such as an antibody. It may be a target linked to a label such as a fluorescent marker which enables its later detection. It may be a DNA or RNA molecule.

The invention is thus applicable in the field of immunoassays but also in other fields, such as ligand binding assays where the analyte species may be a small molecule able to bind with the ligand species which may be a large protein. The invention is specifically designed in view of solid phase immunoassays where the ligand is supported by a solid support.

Immunoassay technique is one of the most efficient and reliable tools used for in vitro diagnostics to detect the presence or measure the concentration of a molecule of interest in a biological sample. It mainly relies on the specific recognition, or interaction, between an antigen and an immunological type ligand such as an antibody. In the solid phase immunoassays, ligand species (for example antibodies) specific to the analyte species to be detected (for example antigens) are immobilized on a solid surface to interact, for example by adsorption or similar process, with the analyte species in the reaction fluid, so as to separate them from the rest of the reaction fluid components.

The prefix "immuno" in the term "immunoassay", for example, should not be considered in the present application as strictly indicating that the binding partner is necessarily a partner of immunological origin, such as an antibody or an antibody fragment. Indeed, as is well known to those skilled in the art, this term is more widely used to also denote tests and methods in which the binding partner is not a partner of immunological origin/nature but consists, for example, of a receptor for the analyte that it is desired to detect and/or quantify. The essential condition is that the binding partner in question is capable of binding to the analyte being sought, in the present case of antibody nature, preferably specifically. Thus, it is known practice to refer to the ELISA assay for assays which use binding partners that are non-immunological stricto sense, more widely called "ligand binding assay", whereas the term "immuno" is included in the title in extenso corresponding to the acronym ELISA. In the interests of clarity and uniformity, the term "immuno" is used in the present application to denote any biological analysis using at least one binding partner suitable for binding to the analyte being sought and detecting and/or quantifying the latter, preferably specifically, even when said binding partner is not of immunological nature or origin in the strict sense.

The reaction fluid may be from various origins such as biological, food, environmental, veterinary, clinical, pharmaceutical or cosmetic samples. Examples of biological samples comprise blood and its derivatives (plasma, serum), urine or stool sample. Examples of food samples comprise dairy products (yogurts, cheeses, etc.), meat, fish, eggs, fruit, vegetables, water, drinks, etc. . . . All these samples, if not in a liquid form, are previously transformed in liquid form. By measuring the amount of analyte species bound to the ligand species, or measuring a variable representative thereof, the initial concentration of the analyte species in the reaction fluid can be estimated. The amount of analyte species which are bound to the ligand species can be detected with label molecules like radio labels, fluorescent labels, luminescent labels or enzyme relabeled. It can also be detected through piezoelectric effect, electrochemistry or optical techniques like ellipsometry, optical wave guidance and surface plasmon resonance (SPR).

When faced with the task of devising an assay for qualitatively assessing or quantitatively measuring the presence, amount or functional activity of the target species, it is necessary to define many different aspects of the assay. The definition of the assay includes the selection of defining features for the assay. Defining features to be selected may include the support material (composition, size, shape, and/or roughness, . . . ), the ligand species, and the analyte species which will be used for the assay. Defining features may also include techniques used for immobilizing the ligand species on the solid support, which may impact the amount or concentration of ligand species coated on the support material in the reaction chamber which, in production, is constituted by the production assay reactor. Defining features may also include, at least in some cases, the temperature of the reaction fluid during the assay.

The definition of the assay may also include defining at least one operating parameter for the assay chemical reaction. The at least one operating parameter may relate to a reaction fluid flow rate, to a concentration of the analyte species in the reaction fluid, to the support volume, to the fluid volume, to the support surface area, to the stirring speed, and/or to the timing, etc. . . .

It is well known to the skilled in the art that both the defining features and the operating parameters may have an influence on the performance of the assay, ranging from the assay providing no result to the assay providing highly accurate, sensitive and fast results, with assays which provide more or less satisfactory results under more or less convenient operational parameters. Indeed the value of a given assay may reside in a balance between accuracy, repeatability, robustness, duration, cost, ease of implementation, etc. . . . Key value elements of the assay may be its sensitivity, its specificity and/or its time-to-result. Such value elements are critical for a production assay which is to be repeated innumerable times.

In the field of solid phase immunoassays, one critical part of defining the assay is selecting the appropriate ligands and solid supports which will be used for manufacturing the production assay reactors, because, as stated above, it will impact directly the sensitivity, the specificity and/or the time-to-result of the production assay. In particular, the selection will impact on the one hand the efficiency of the bounding to the solid support and the accessibility of the ligands to the analyte once the ligands are bound on the support surface. The selection is thus based at least onto two complex issues. Classically, these choices are made empirically, with some trial and error testing, which can in some cases prove lengthy and costly, and/or which can prove to fail to give an optimum result. The selection of defining features such as the appropriate ligands and solid supports does not lend itself to be easily repeated, because it would mean manufacturing prototypes of the production assay reactors, including such steps as molding the prototypes and then coating those prototypes with the appropriate ligand species. Such prototypes cannot usually be made using the same tools and methods as those used for the production assay reactors, because the tools used for manufacturing the production assay reactors are usually chosen for their capacity for mass manufacturing.

On the other hand, even if such prototypes can be manufactured, there remains the need of being able to assess the performance of such prototypes, and more specifically to be able to assess what is the contribution of the selection of the ligand species and solid support material in the performance of the reaction.

It would thus be extremely useful to have a method that would facilitate the definition of such an assay.

One object of the invention is to be able to manufacture a production assay reactor made of a support material comprising a reactive active surface which allows the assay chemical reaction to be performed optimally under a set of operating parameters suitable for a production assay.

One key aspect of such definition is to be able to predict the kinetics of the assay chemical reaction for a given set of defining features. The kinetics of the assay chemical reaction can be represented by one or several characterizing parameters of the assay chemical reaction for that given set of defining features.

It is well known to use assay digital models which are representative of an assay chemical reaction. Such assay digital model, once defined, may be used to calculate and/or predict the values of one or several output variables which should be representative of one or several physical or chemical parameters which is/are descriptive of a progression of the assay chemical reaction. Typically, such output variable may comprise a concentration of a species, the presence of a species, a duration, etc. . . . A digital model, such as the assay digital model, including under its forms of the assay digital calibration model and its form of the assay production model discussed hereunder, can be a set of parametric equations, said set possibly including parametric differential equations.

An assay digital model is typically linked to a set of defining features for the assay of which it is representative. An assay digital model may have certain terms of the model which depend upon some operating parameters under which the assay chemical reaction is performed. At least some of these operating parameters can be linked to the setup used for performing the assay chemical reaction, for example being different between an experimental setup and a production setup. At least some of the terms of the assay digital model can thus be of no effect on the result provided by the model when the digital model is applied to an experimental setup or of no effect on the result provided by the model when the digital model is applied to a production setup. On the other hand, an assay digital model typically comprises terms, i.e. characterizing parameters, which depend on the set of defining features but which preferably do not depend on the operating parameters. The characterizing parameters are associated to a given set of defining features. They are valid when the digital model is used to describe the given chemical assay reaction for a first set of operating parameters, for example when the digital model is applied to a first setup, but also valid when the digital model is used to describe the same given chemical assay reaction for a second set of operating parameters, having some operating parameters which are different from those of the first set of operating parameters, for example when the assay digital model is applied to a production setup.

Being able to access to the value of those characterizing parameters, which are intimately linked to the defining features, will thus be of practical use for firstly deciding whether a set of defining features is suitable for its intended use, that is to say deciding whether the final product, including for example the final production assay reactor, which is manufactured according the chosen set of defining features (comprising at least the solid support and the ligands immobilized thereon) is suitable for its intended use. It can also be key for defining, through computation, the optimal values of at least some operating parameters in view of the intended use.

There are several kinetic digital models describing the binding of an analyte species with a ligand species immobilized on a solid surface.

Some of these models are first based on a model which represents the dynamic association/dissociation process, involved in the assay chemical reaction, i.e. in the antigen-antibody interaction.

Simple biomolecular or one-to-one interaction models are probably the simplest models for modeling the interaction of a given analyte species to a given species. Such models are described in the following documents:

Morton et al., 1995: Morton, T., Myszka, D., and Chaiken, I. (1995). "Interpreting Complex Binding Kinetics from Optical Biosensors: A Comparison of Analysis by Linearization, the Integrated Rate Equation, and Numerical Integration". *Analytical Biochemistry,* 227(1):176-185;

Karlsson et al., 1991: Karlsson, R., Michaelsson, A., and Mattsson, L. (1991), "Kinetic analysis of monoclonal antibody-antigen interactions with a new biosensor based analytical system", *Journal of Immunological Methods,* 145(1-2):229-240;

Voss, 1993: Voss, E. W. (1993), "Kinetic measurements of molecular interactions by spectrofluorometry", *Journal of Molecular Recognition,* 6(2):51-58;

Renard et al., 1995: Renard, J., Vidal-Madjar, C., and Lapresle, C. (1995). «Determination by Chromatographic Methods of the Adsorption Rate Constant of HSA on Immobilized Polyclonal and Monoclonal Antibodies", *Journal of Colloid and Interface Science,* 174(1):61-67;

Bongrand, 1999: Bongrand, P. (1999), "Ligand-receptor interactions" Reports on Progress in Physics, 62(6):921-968;

Schräml and von Proff, 2012: Schräml, M. and von Proff, L. (2012), "Temperature-Dependent Antibody Kinetics as a Tool in Antibody Lead Selection", In Proetzel, G. and Ebersbach, H., editors, *Antibody Methods and Protocols,* volume 901, pages 183194, Humana Press, Totowa, NJ;

Chang et al., 2012: Chang, L., Rissin, D. M., Fournier, D. R., Piech, T., Patel, P. P., Wilson, D. H., and Duffy, D. C. (2012), "Single molecule enzyme-linked immunosorbent assays: Theoretical considerations", *Journal of Immunological Methods,* 378(1-2):102115;

Dinh et al., 2016: Dinh, T. L., Ngan, K. C., Shoemaker, C. B., and Walt, D. R. (2016), "Using Antigen-antibody Binding Kinetic Parameters to Understand Single-Molecule Array Immunoassay Performance", *Analytical Chemistry,* 88(23):11335-11339.

Two-state conformational change models have also been described in Morton et al., 1995, referenced above, and in Myszka et al., 1997: Myszka, D. G., Morton, T. A., Doyle, M. L., and Chaiken, I. M. (1997), "Kinetic analysis of a protein antigen-antibody interaction limited by mass transport on an optical biosensor", *Biophysical Chemistry,* 64(1-3):127-137.

Three-state conformational change models have also been described in Myszka et al., 1997, referenced above.

Surface heterogeneity (or heterogeneous ligand) models have also been described in Morton et al., 1995, and in Myszka et al., 1997, both referenced above.

Bivalent analyte binding models have also been described in:

Tiwari et al., 2015: Tiwari, P. B., Uren, A., He, J., Darici, Y., and Wang, X. (2015). Note: "Model identification and analysis of bivalent analyte surface plasmon resonance data", *Review of Scientific Instruments,* 86(10):106107;

Gelinsky-Wersing et al., 2017: Gelinsky-Wersing, D., Wersing, W., and Pompe, W. (2017), "Bivalent kinetic binding model to surface plasmon resonance studies of antigen-antibody displacement reactions", *Analytical Biochemistry,* 518:110-125.

Competing analyte models are described in John R. Crowther (2009), The ELISA Guidebook-2nd Edition, Humana Press, 21:36.

The above models representing the dynamic association/dissociation processes involved in the antibody-antigen interaction may be advantageously complemented by a mass transport model which represents the process related to the transport of analyte species to and from the solid surface on which the ligand species are coated. Examples of such mass transport models can be found in the following documents:

Myszka et al., 1997, referenced above;

Bird et al., 2007: Bird, R. B., Stewart, W. E., and Lightfoot, E. N. (2007), "Transport phenomena", Wiley, New York, rev. 2. ed edition, OCLC: 255914840;

Karlsson et al., 1994: Karlsson, R., Roos, H., Fägerstam, L., and Persson, B. (1994), "Kinetic and Concentration Analysis Using BIA Technology", *Methods,* 6(2):99110;

Myszka, 1997: "Kinetic analysis of macromolecular interactions using surface plasmon resonance biosensors", *Current Opinion in Biotechnology,* 8(1):50-57.

Affinity Chromatography

Chromatography is a physicochemical method which can be used to separate different substances present in a mixture. In chromatography, a mobile fluid phase (gas or liquid) carrying different components flows through a stationary phase, such as a solid phase. Components of the mobile phase may interact with the stationary phase. The stationary phase retains more or less strongly the components of the mobile phase depending on the intensity of the interactions between the components of the mobile phase with the stationary phase. That is how components are separated. It is known to perform affinity chromatography in a flow-through column. At the outlet of the column, components can be detected thanks to radioactivity, ultraviolet or visible absorbance, fluorescence, light scattering. Chromatography can be used to study the kinetics of the interactions between the components of the mobile phase with the stationary phase.

Affinity chromatography is a type of fluid chromatography in which an immobilized biologically-related agent is used as the stationary phase. The immobilized biologically-related agent may be called a ligand. The mobile phase contains a solute which may be called analyte, diluted in a solvent and capable of binding with the ligand. Common ligands in affinity chromatography include antigens, antibodies, inhibitors, substrates, cofactors, coenzymes, lectins, protein A, protein G, DNA, RNA, boronates, synthetic dyes, metal-ion chelated or other ligand which may be generated by combinatorial chemistry of peptide, phage display, or aptamer ligands. Common solutes in affinity chromatography include antigens (e.g., drugs, hormones, peptides, proteins, viruses, cell components), antibodies, enzymes, sugars, glycoproteins, glycolipids, DNA/RNA-binding proteins, carbohydrates, nucleosides, nucleotides, nucleic acids, glycoproteins, cathechols, metal-binding amino acids.

In affinity chromatography, a ligand is immobilized on a chromatographic support in a reaction chamber, such as an affinity chromatography column, while an analyte, complementary to the ligand and diluted in a fluid carrier, is injected at the inlet of the column at an initial time point t=0. Analyte concentration is measured at the outlet of the reaction chamber and elution curves can be plotted (analyte concentration versus time or analyte concentration versus volume of mobile phase that has crossed the column from initial time point t=0). The observed peak or elution profile for the injected analyte is then used to extract information on the kinetics of interaction between analyte and ligand. When designing an affinity chromatography method, the support material (often porous to maximize immobilization surface) must be chosen carefully taking into account the following criteria:

Chemical inertness: the support material must be inert toward solutes but easy to couple with ligands.

Chemical stability: the support material must be chemically stable under the operating conditions defined by operating parameters.

Mechanical stability: the support material must withstand the pressure drop across the chromatography reaction chamber.

Pore size: the pore size of the support material is a compromise between allowing the analyte to enter the pores and maximizing the surface area used to immobilize ligands.

Particle Size: the particle size of the support material is a compromise between preventing mass transfer limitations and not provoking too high pressure drop.

Particle shape: the particle shape of the support material is a way to reduce mass transfer limitations and pressure drop and to increase support surface area at the same time.

There are two main different ways of performing analytical affinity chromatography:

zonal elution involves a short analyte pulse injection. The elution volume, that is the mobile phase volume required on average for an analyte molecule to pass through the reaction chamber, is determined from the first moment of the effluent peak.

frontal elution involves continuous injection of analyte into the column until the solid phase in the column is saturated. The elution volume is determined with the entire effluent concentration response, which is sometimes called the breakthrough curve.

Frontal elution is better to determine elution volumes but it requires a larger amount of sample compared to zonal elution. Elution volume is determined from the elution curve, typically plotting analyte concentration versus volume of mobile phase. Retention time, noted $t_R$, is determined as the first moment of the curve plotting the analyte concentration versus time. The n order moment is a mathematical function defined by the integral between two times t1 and t2 of the function t^n f(t) dt. Here the function f(t) is the concentration profile versus the time. It is also called mean residence time and corresponds to the average time it takes for a particular analyte to pass through the reaction chamber.

Association and dissociation processes occurring in a chromatography reaction chamber have been modeled in order to extract kinetic parameters like affinity and association and dissociation rate constants from elution curves.

In affinity chromatography, porous particles are often used as immobilization support to allow a very large surface area and have an improved purification or separation capacity. The use of non-porous particles as chromatography support is more recent. With non-porous particles, protein separation has been reported to be faster due to the absence of resistance linked to pore diffusion (Lee and Chen, 2001, referenced below).

However, a model describing the binding of analytes A with ligands B immobilized on non-porous particles to form complexes AB has been presented by:

Mao et al., 1991: Mao, Q., Johnston, A., Prince, I., and Hearn, M. (1991), "High-performance liquid chromatography of amino acids, peptides and proteins", *Journal of Chromatography A*, 548:147-163;

Lee and Chen, 2001: Lee, W.-C. and Chen, C.-H. (2001), "Predicting the elution behavior of proteins in affinity chromatography on non-porous particles", *Journal of Biochemical and Biophysical Methods*, 49(1-3):63-82.

The kinetic model used is the one-to-one interaction model described above and the mass transfer model is also as detailed above. The hydrodynamic model is one dimensional and considers spherical particles. The model supposes that axial dispersion is negligible and that fluid velocity is uniform over the cross-section of the column and constant with respect to time.

More complex models, where axial dispersion is not neglected, have been suggested by various authors:

Chaiken and Chemical Rubber Company, 1987: Chaiken, I. M. and Chemical Rubber Company, editors (1987). *Analytical affinity chromatography*, CRC Pr, Boca Raton, Fla. OCLC: 246691774;

Sridhar et al., 1994: Sridhar, P., Sastri, N. V. S., Modak, J. M., and Mukherjee, A. K. (1994), "Mathematical simulation of bioseparation in an affinity packed column", *Chemical Engineering & Technology*, 17(6):422429;

Sandoval et al., 2012: Sandoval, G., Andrews, B. A., and Asenjo, J. A., (2012), "Elution relationships to model affinity chromatography using a general rate model", *Journal of Molecular Recognition*, 25(11):571579;

de Sousa Junior et al., 2016: de Sousa Junior, F. C., de Araújo Padilha, C. E., Chibério, A. S., Ribeiro, V. T., Martins, D. R. A., de Oliveira, J. A., de Macedo, G. R., and dos Santos, E. S., (2016), "Modeling and simulation of breakthrough curves of recombinant 503 antigen using immobilized metal affinity expanded bed adsorption chromatography", *Separation and Purification Technology*, 164:3440.

Parameter estimation in affinity chromatography

Models are based on mechanisms that can be validated from experimental elution curves. The corresponding kinetic parameters can be extracted from these data.

a) Analytical Methods

Also called plate height method, the brand broadening method is the earliest chromatographic approach used for kinetics studies. This method relies on plate theory of chromatography and requires linear conditions. The chromatography column is divided into N theoretical well-mixed stages called "plates". The number of stages (N) is a direct measure of the broadening of a chromatography peak after crossing the column. The more broadened is the peak, the more theoretical plates there are.

To make kinetic measurements, "reversed-role" affinity chromatography is often used. This type of chromatography uses a small soluble agent that competes with the analyte to bind to the ligand. This soluble agent is called the inhibitor (see Chaiken and Chemical Rubber Company, 1987 cited above).

Analyte is injected at several flow rates in an affinity column and in an inert control column that contains the same support but no immobilized ligands.

For each flow rate, plate height values are determined for the affinity and the inert column by evaluating the first and the second moments of the experimental elution curves. The inert column is used to determine the plate height contribution due to processes other than analyte-stationary phase interaction.

The plate-height contribution due to the analyte-stationary phase interaction is thus determined by calculating the difference between total plate height for the affinity column and total plate height for the inert column. Retention times are calculated from experimental curves.

The appropriate ligands and solid supports $K_a$, also called affinity of the couple analyte/ligand ($m^3 \cdot mol^{-1}$), and the intrinsic association and dissociation rates $k_a$ ($m^3 \cdot mol^{-1} \cdot s^{-1}$) and $k_d$ ($s^{-1}$) can be determined.

b) Numerical Methods

Instead of using elution curves to determine the height equivalent to a theoretical plate, digital models can be implemented with programming languages like Matlab, Fortran, C, C++ or Python. The balance equations in the liquid phase and in the solid phase can be discretized using discrete elements to obtain ordinary differential equations that can be solved using Matlab functions like ode15s for example (see Sandoval et al., 2012, cited above). Elution curves may then be simulated with these implemented models and fitted to experimental elution curves to extract parameters by minimizing a distance between model predictions and experimental results (see Sandoval et al., 2012, and de Sousa Junior et al., 2016, both cited above).

Surface Plasmon Resonance (SPR) Biosensors

Affinity-based optical biosensors are an evolution of affinity chromatography. Instead of being immobilized on particles placed in a chromatography column, ligands are immobilized on a sensor surface. The detection of analytes at the outlet of the chromatography column is replaced by the real-time monitoring of the analyte-ligand complex formation on the sensor surface. Thus, with optical biosensors, binding process is studied directly instead of being studied indirectly in a chromatography column. A widely used type of optical biosensor is based on Surface Plasmon Resonance.

SPR technique is more direct than affinity chromatography. The interaction is measured directly at the sensor surface and the signal is proportional to the amount of bound analyte. The signal depends on analyte affinity for the ligand but also on the analyte size and the analyte concentration. Consequently it can be difficult to detect small analytes or small concentrations.

Surface Plasmon Resonance is often used for monitoring kinetics of molecular interactions between two proteins but also between proteins and other molecules (drug candidates, nucleic acids, lipids, etc. . . . ). It has been used to characterize antibody-antigen interactions for approximately two decades.

a) Existing SPR Based Techniques

In 1990, Pharmacia Biosensor, which became Biacore AB in 1996, developed a system based on SPR phenomenon for real-time monitoring of molecular interactions. This system named BIAcore® enables the study of the binding between an immobilized ligand and an analyte.

By monitoring changes in the SPR angle, BIAcore® enables to follow in real-time the concentration of analyte bound to the ligands without the need of any fluorescent, electro-chemical or radioactive label.

b) SPR System Modeling

Association and dissociation processes occurring in BIAcore® system have been modeled in order to extract kinetic parameters from BIAcore® curves by fitting simulated data on BIAcore® experimental data. The extracted parameters can then be used to rank and compare different antibodies for the selection of reagents (Karlsson et al., 1991). Different models have been developed. Among the known models, the simplest kinetic model is the bimolecular model, also called one-to-one interaction model. Models may differ in their consideration or not of mass transfer and in their hydrodynamic model.

The one-to-one interaction uniform model assumes that mass transfer can be neglected. Moreover, as the analyte is injected continuously in the flow cell, the analyte solution is constantly replenished and the free concentration of analyte in the flow cell is considered constant, uniform and equal to the injected analyte concentration. However, the SPR signal is not only driven by this dynamic association/dissociation process. Before binding to ligand, analyte must first be transported to the sensor surface. Thus, the SPR signal reflects chemical processes coupled with transport processes, as described by Myszka et al., 1998: Myszka, D. G., He, X., Dembo, M., Morton, T. A., and Goldstein, B., 1998, "Extending the range of rate constants available from BIACORE: interpreting mass transport-influenced binding data", *Biophysical Journal*, 75(2):583-594.

When mass transport limitation cannot be avoided because of experimental constraints, a more realistic model including mass transport has to be used (Myszka, 1997, cited above). To take into account mass transfer, a simple model has first been introduced: the two-compartment model or film model. This model assumes that the transport of analyte from the bulk of the fluid to the surface of the particle is described by a film resistance mechanism and divides the BIAcore® flow chamber into two compartments:

an inner compartment close to the sensor surface (film);
an outer compartment, bigger, constituting the bulk of the fluid.

The concentrations of analytes in both compartments vary in time but they are considered uniform in each compartment. It has been shown that this approximation for the description of transport and binding is sufficient to accurately analyze the data. Association and dissociation rate constants extracted with this two-compartment model have been shown to be consistent with those extracted with a two-dimensional model that does not make this uniformity assumption (Myszka et al., 1997, cited above).

More complex two-dimensional models have also been proposed that do not divide the flow cell into two compartments but that take into account a dependency along the height of the flow cell c) Parameter Estimation The models previously exposed can be used to extract kinetic parameters from curves. Data are simulated with these models and then fitted to experimental data to extract parameters.

c1) Analytical Integration

Analytical integration is possible in cases where the model has an analytical solution.

For the association phase (injection of analyte from t=0 at constant analyte inlet concentration)

Supposing $k_d$ and analyte inlet concentration are known, curve fitting can be performed. Thus, $k_a$ can be estimated with non-linear least squares method which determines the best value to minimize the difference between experimental and simulated data. Analyte inlet concentration is known as it is the injected analyte concentration. Also, the BIAcore® system delivers a value called Rmax, which in certain limited cases, such as for some proteins, is said to have some proportionality or at least some relationship with the maximum concentration of analyte species bound to a ligand element coated on the support material. However, outside of these very specific cases, no inference can be made for the maximum concentration of analyte species bound to a ligand element coated on the support material.

For the dissociation phase (injection of buffer solution with no analyte at t=0) after an association phase:

$k_d$ can be determined by curve fitting using non-linear least squares method (O'Shannessy et al., 1993).

c2) Numerical Integration

Time is discretized and, considering initial conditions, complex and analyte concentrations are calculated for each time step thanks to the equations giving the variation over time of the concentrations for the chosen model (Morton et al., 1995, cited above). $k_a$, $k_d$, $k_M$ (mass transport coefficient) are then determined as the best values to minimize the difference between experimental and simulated data with nonlinear least-squares fitting of the data (Myszka et al., 1998, cited above). Again, except in some very specific cases, no inference can be made for the maximum concentration of analyte species bound to a ligand element coated on the support material.

To increase the accuracy of parameter estimation a method called global analysis has been proposed. The method consists in fitting simultaneously data obtained for different concentrations of immobilized ligands. Indeed, for a low ligand concentration, mass transport is not the limiting step and data are not sensitive to mass transport coefficient. Thus, this parameter cannot be accurately determined. On the opposite, for high ligand concentration, kinetics is not the limiting step and data are not sensitive to association and dissociation rates. Data is fitted for a large range of ligand concentration ensuring that data depends on both mass transport and kinetics (see Morton et al., 1995, and Myszka, 1997, and Myszka et al., 1997, all cited above).

It is to be noted that the values of $k_a$, $k_d$ which are delivered by the BIAcore® system are valid under the specific defining features applicable in the BIAcore® system. However, in most cases, a production assay would correspond to a different set of defining features. For example, the support material in the BIAcore® system is specific to the corresponding chip used in the system. There is no way to implement the system with a different support material. Thus, the values of $k_a$, $k_d$ which are delivered cannot be used for estimating precisely the characterizing parameters with a different support material.

The invention thus provides for a method of measuring the values of one or several characterizing parameters representative of the kinetics of an assay chemical reaction between:
- a given ligand species coated on a solid surface of a given support material to form thereon a reactive solid surface, and
- a given analyte species contained in a reaction fluid,
- where the given analyte species is able to bind with the given ligand species according to the assay chemical reaction when a reaction fluid containing the given analyte species is brought into contact with the given support material on which the given ligand species is coated.

The method includes:
- providing a calibration tool comprising a reaction chamber;
- for a given set of defining features, including a given support material, a given ligand species, and a given analyte species, providing, in the reaction chamber, discrete particles including discrete reactive particles having a reactive solid surface made of the given support material on which a population of the given ligand species is coated, and
- for the given set of defining features, performing a series of calibration experiments:
  - in which a reaction fluid, having a known input concentration of the given analyte species, is injected in the reaction chamber,
  - in which calibration experiment results include, for a given calibration experiment, several measurements of at least one output variable at different successive measurement times during said given calibration experiment,
  - and where, to obtain a series of calibration experiment results, different calibration experiments in a series are performed under different sets of calibration values of at least one operating parameter, the at least one operating parameter being selected in the list including the reaction fluid flow rate through the calibration tool, the input concentration of the given analyte species in the reaction fluid, the total area of the reactive solid surface of the support material in the reaction chamber;
- providing, in an electronic computer unit, an assay digital calibration model representative of the kinetics of the assay chemical reaction in the calibration tool, where the assay digital calibration model comprises one or several characterizing parameters, the values of which have a dependency on the given set of defining features used for the calibration experiments;
- fitting, by computation in the electronic computer unit, the values of the characterizing parameters for the given set of defining features, based on the series of calibration experiment results.

In the method, the reaction chamber is a stirred-tank reactor.

The invention also provides for a method of predicting the kinetics of an assay chemical reaction between a given ligand species coated on a solid surface of a given support material and a given analyte species contained in a reaction fluid, wherein the method includes calculating at least one output variable using an assay digital production model representative of the kinetics of the assay chemical reaction, with the values of the characterizing parameters for the given set of defining features, which have been fitted by computation based on a series of calibration experiments, according to the method above.

The invention also provides for a method of producing a production assay reactor having a solid surface made of a given support material coated with a given ligand species, wherein at least one of the given support material and of the given ligand species has been selected according to the above method for predicting the kinetics of an assay chemical reaction between the given ligand species coated on said given solid surface of the given support material and a given analyte species contained in a reaction fluid.

The invention also provides for a method for manufacturing a production assay reactor for use in a production assay involving a production assay chemical reaction, said production assay reactor having a reactive solid surface made of a support material coated with a ligand species, and said production assay chemical reaction being between a given analyte species, contained in a reaction fluid, and the ligand species when a reaction fluid containing the given analyte species is brought into contact with said reactive solid surface of the production assay reactor.

Such method comprises:
i. providing a calibration tool comprising a reaction chamber, wherein the reaction chamber is a stirred-tank reactor;
ii. selecting a given set of defining features including, in addition to said given analyte species, a given support material and a given ligand species;
iii. for the selected given set of defining features, measuring characterizing parameters of an assay chemical reaction between the given analytes species contained in a reaction fluid and the given ligand species on a reactive solid surface made of the given support coated with the given ligand species, said measuring being carried out by:
   a. manufacturing discrete particles including discrete reactive particles having a reactive solid surface made of the given support material on which a population of the given ligand species is coated and providing said discrete particles in the reaction chamber;
   b. performing a series of calibration experiments:
      in which a reaction fluid, having a known input concentration of the given analyte species, is injected in the reaction chamber,
      in which calibration experiment results include, for a given calibration experiment, several measurements of at least one output variable at different successive measurement times during said given calibration experiment, and where, to obtain a series of calibration experiment results, different calibration experiments in a series are performed under different sets of calibration values of at least one operating parameter, the at least one operating parameter being selected in the list including the reaction fluid flow rate through the calibration tool, the input concentration of the given analyte species in the reaction fluid, the total area of the reactive solid surface of the support material in the reaction chamber, c. for the given set of defining features, computing by fitting in an electronic computer unit the values of characterizing parameters of an assay digital calibration model representative of the kinetics of the assay chemical reaction in the calibration tool, based on the series of calibration experiment results, where the values of the characterizing parameters have a dependency on the given set of defining features used for the calibration experiments, iv. modifying the set of given defining features and carrying out step iii with the modified set of defining features as long as the computed values of the characterizing parameters are not suitable for the production assay reaction or as long as a range of sets of defining features is not fully scanned;

v. storing, as suitable defining features including at least a suitable support material and a corresponding suitable ligand species, at least one set of said given defining features for which the computed values of the characterizing parameters are suitable for the production assay;

vi. manufacturing the production assay reactor according to the suitable defining features, including manufacturing the production assay reactor with a support surface made of the suitable support material and coating said support surface with the corresponding suitable ligand species.

Also the invention provides for system for measuring the values of one or several characterizing parameters representative of the kinetics of an assay chemical reaction between a given ligand species coated on a solid surface of a given support material to form thereon a reactive solid surface and a given analyte species contained in a reaction fluid. Said system comprises:

a calibration tool comprising a reaction chamber containing discrete particles including discrete reactive particles having a reactive solid surface made of the given support material on which a population of the given ligand species is coated, and;

an inlet circuit configured to inject in the reaction chamber, for a series of calibration experiments, a reaction fluid having a known input concentration of the given analyte species;

at least one sensor configured to measure calibration experiment results for a given calibration experiment, including several measurements of at least one output variable at different successive measurement times during said given calibration experiment, an electronic computer unit configured to record, for a given set of defining features, including a given support material, a given ligand species, and a given analyte species, the calibration experiment results from a series of calibration experiments, where different calibration experiments in a series are performed under different sets of calibration values of at least one operating parameter of the system, the at least one operating parameter being selected in the list including the reaction fluid flow rate through the calibration tool, the input concentration of the given analyte species in the reaction fluid, the total area of the reactive solid surface of the support material in the reaction chamber.

In such system, the reaction chamber is a stirred-tank reactor.

The methods and systems according to the invention will be further described in detail below with reference to the accompanying drawings showing some embodiments of the invention.

Figure 3:
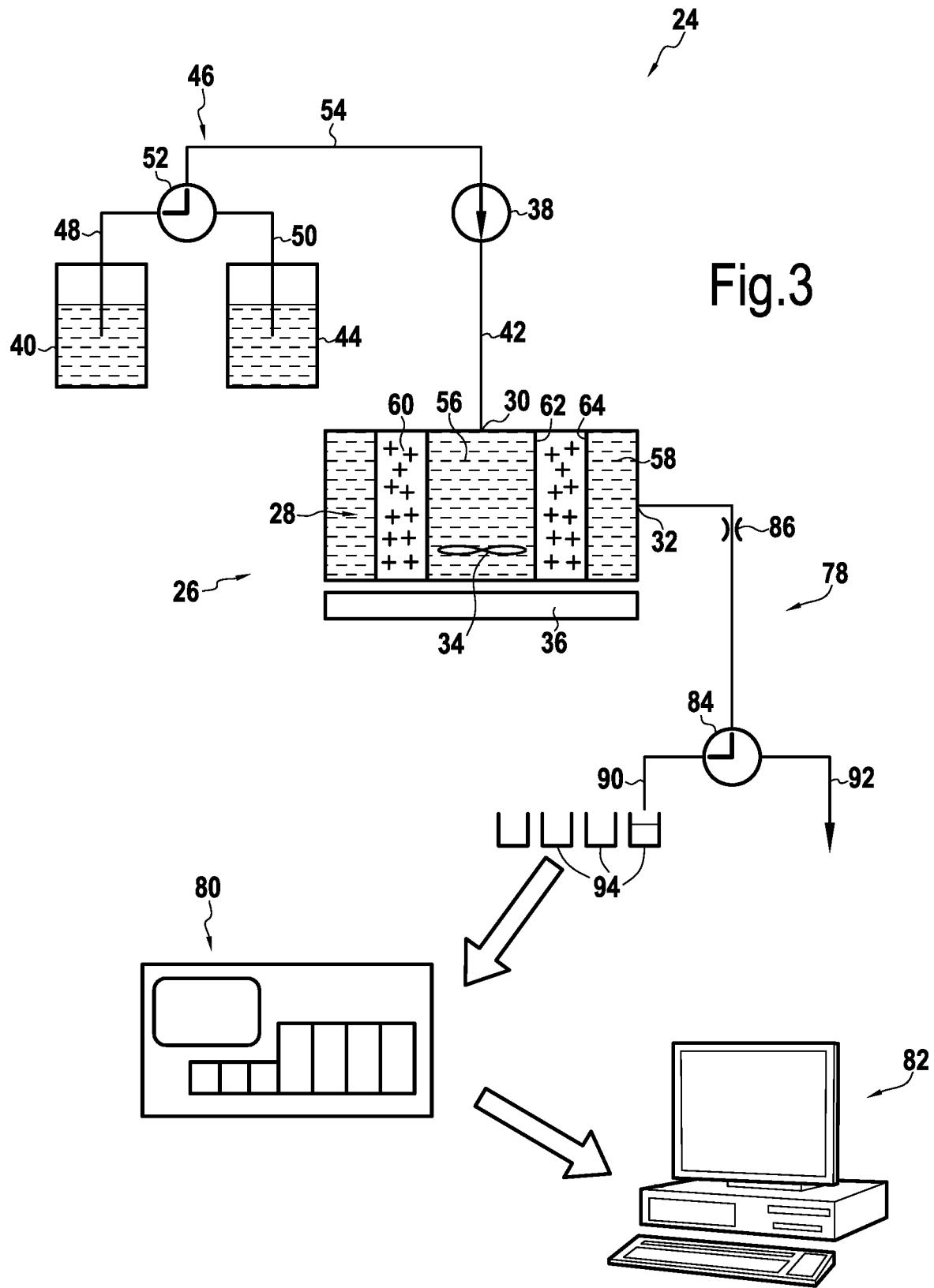
Figure 4:
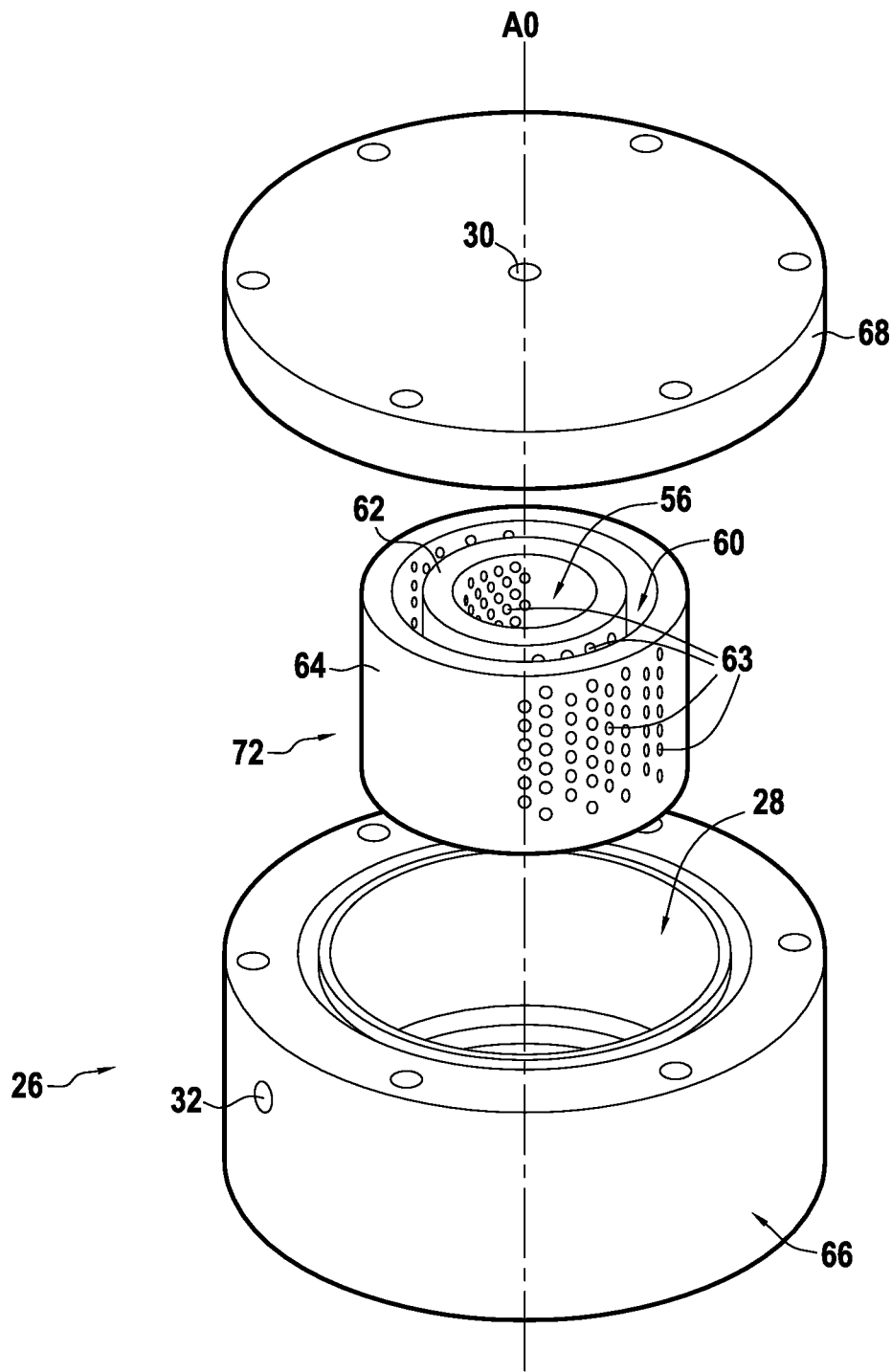
Figure 5:
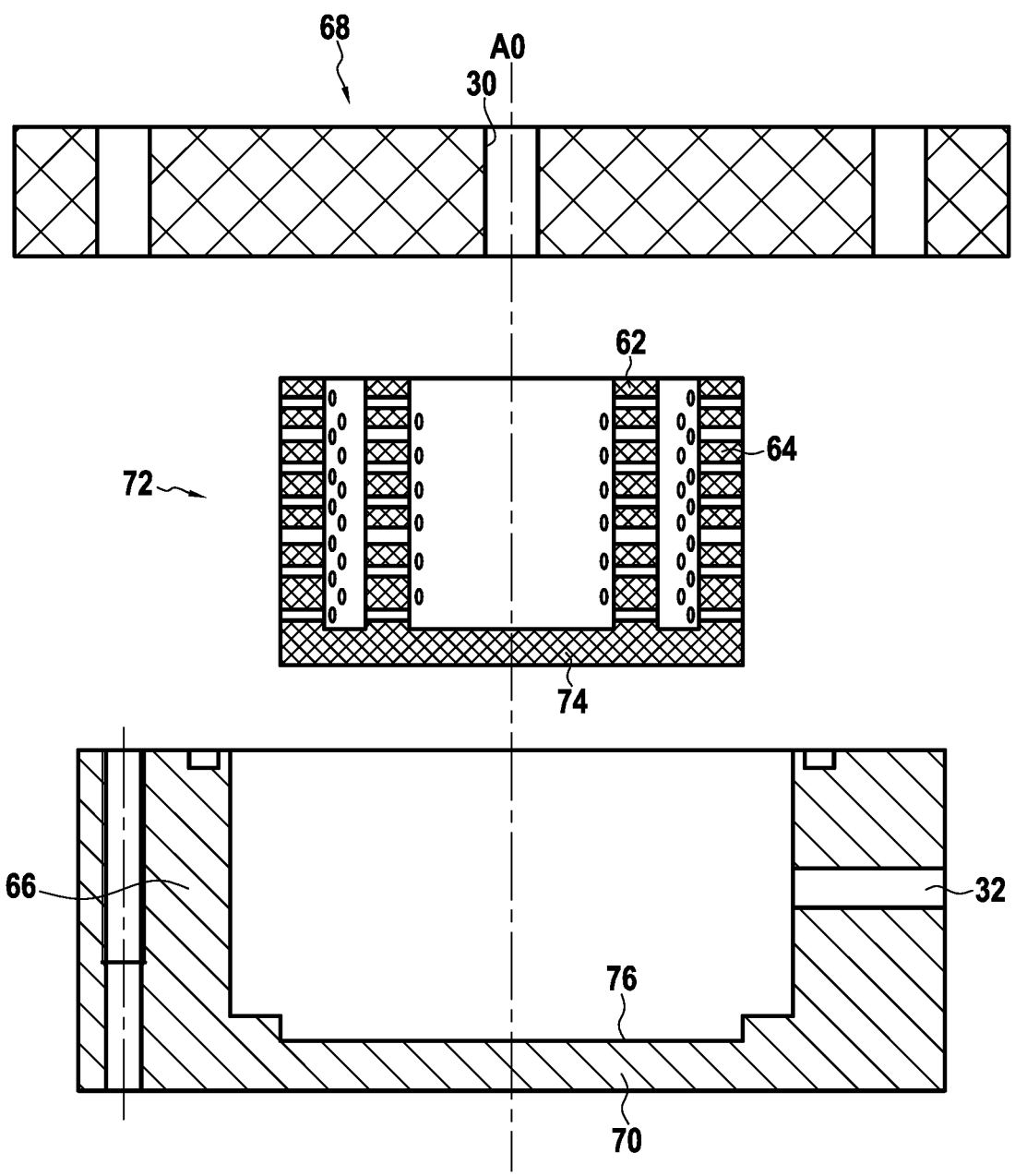
Figure 6:
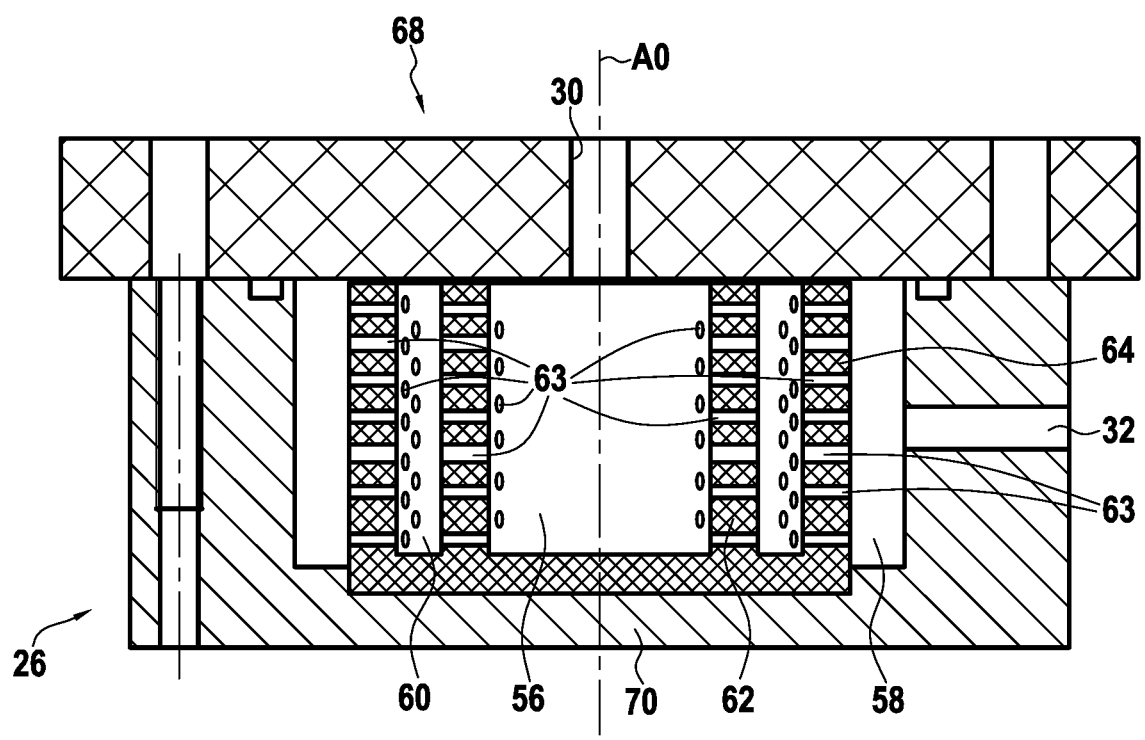

FIG. 3 represents a scheme of some elements of an experimental setup of a system for measuring the values of one or several characterizing parameters representative of the kinetics of an assay chemical reaction between a given ligand species coated on a solid surface of a given support material and a given analyte species contained in a reaction fluid, which may be used for implementing at least some of the steps of a method according to the invention;

FIG. 4 represents a schematic exploded perspective view of an example of a reaction chamber which can be used in a method according to the invention;

FIG. 5 represents a schematic exploded cut-out view of the reaction chamber of FIG. 4;

FIG. 6 represents a schematic cut-out view of the reaction chamber of FIG. 4, assembled;

FIGS. 7A-7D represent plots of a series of calibration experiments results; and

Figure 8:
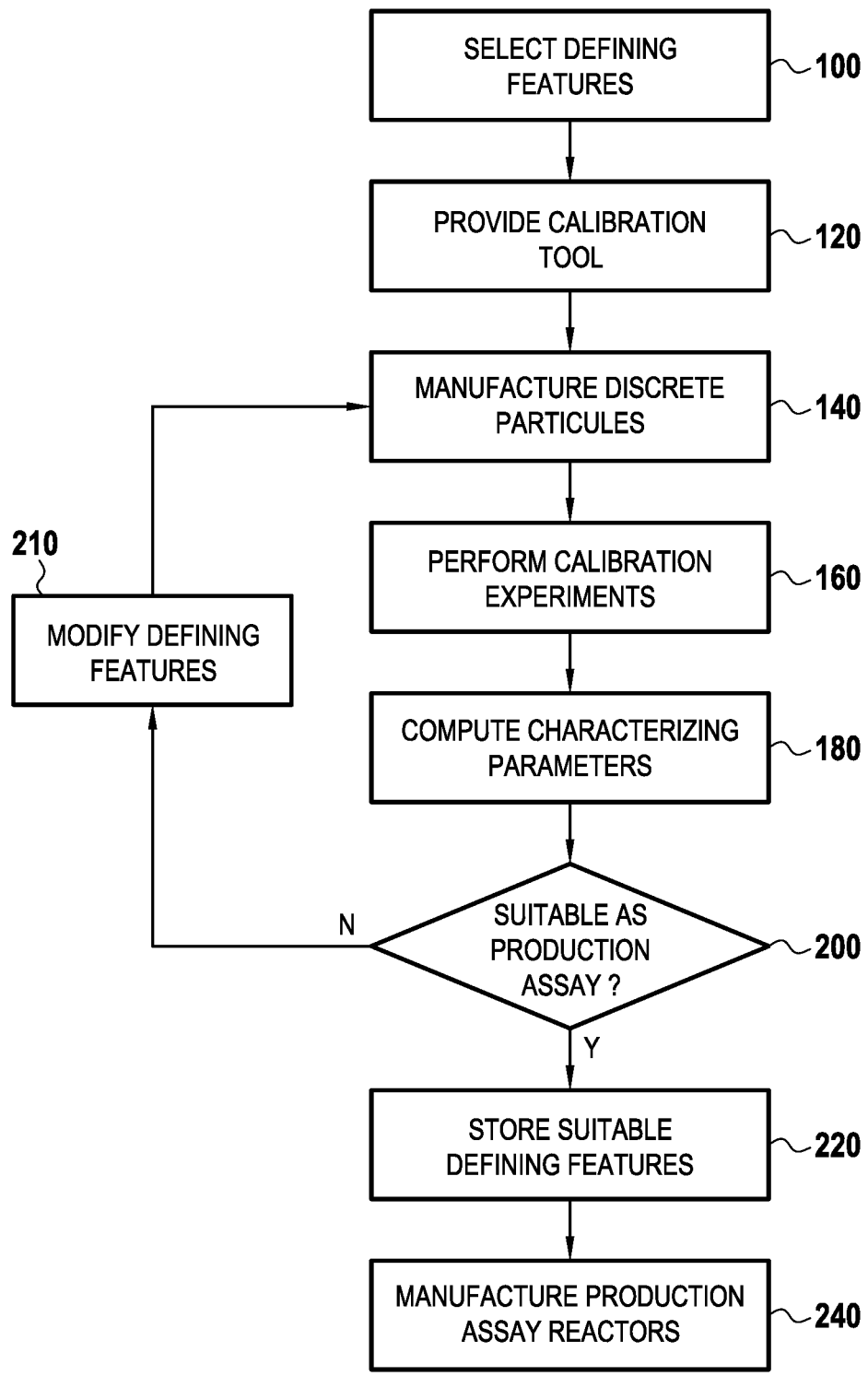

FIG. 8 is a diagram representing steps of a method for manufacturing a production assay reactor for use in a production assay involving a production assay chemical reaction.

DETAILED DESCRIPTION

According to one aspect the invention relates to methods for measuring the values of one or several characterizing parameters representative of the kinetics of an assay chemical reaction. Such measurement is not necessarily a direct measurement, but may be an indirect measurement based on measurement of physical output variables of the assay chemical reaction. The one or several characterizing parameters are derived from those measurements. Such methods for measuring the values of one or several characterizing parameters may be incorporated in methods for predicting the kinetics of a production assay, and/or into methods for manufacturing a production assay.

The assay chemical reaction is an interaction between a given ligand species and a given analyte species which may for example be contained in a reaction fluid. More precisely, the invention is related to the case where, in the assay chemical reaction, the given ligand species is coated on a solid surface of a given support material. Hereinafter, the terms "coated" and "coating" imply that the given ligand species is immobilized on the solid surface of the given support material, in such a way that at least part of the ligand species population thus immobilized is prone to reacting with a suitable analyte species, whatever the technique used for such immobilization. The part of the solid surface which is coated with the given ligand species may be called a reactive solid surface. According to the assay chemical reaction, the given analyte species is able to bind with the given ligand species when the reaction fluid containing the given analyte species is brought into contact with the given support material on which the given ligand species is coated.

The invention mainly aims at the direct industrial application of determining the defining features which will allow the manufacturing of a production assay reactor suitable for a production assay which involves the assay chemical reaction and which is intended to be repeated multiple times, such that fine tuning of the assay is paramount. Thus, manufacturing a production assay reactor is also one aim of the invention.

Typically, a production assay is devised in view of identifying and/or quantifying a given analyte. For that, it will be necessary to determine, for the production assay, which ligand species shall be used, which support material shall be used, and maybe other defining features such as the methods used for coating the ligand species on the support material. Also, the temperature of the fluid in the production assay reactor may need to be determined.

Indeed, the production assay implements a production assay reactor in which, and/or on which, and/or against which a reaction fluid, possibly containing the analyte species, is presented in order to come into contact with the ligand species for the purpose of enabling the chemical assay reaction.

The production assay reactor may for example be a container for the reaction fluid, for example in the form of a cone, of a test tube, of a well, of well in a test plate comprising several wells, etc. The production assay reactor may be a test surface, such as a test spot on a test plate, supporting the reaction fluid. The production assay reactor may be a dipping instrument which is to be dipped into the reaction fluid. In one hypothesis, at least part of the production assay reactor is an active part having a solid surface made of the support material on which specified ligand species are coated, where the active part is in contact with the reaction fluid during a production assay. In some instances, a production assay reactor may comprise reaction beads, where reaction beads are for example to be contained in a reaction vessel, and where the reaction beads are made of the given support material on which the given ligand species is coated, such that the surface of the beads form the reactive solid surface of the production assay reactor.

A production assay reactor may be single-use or multiple-use, but is typically mass-produced and it may be considered as an accessory or as a consumable.

In some cases, a production assay reactor is configured to be used in a production assay system including an assay machine for at least partly automating the assay. The assay machine may comprise one or several sensors for sensing one or several physical or chemical parameters which is/are descriptive of the assay reaction. The one or several physical or chemical parameters may directly or indirectly qualify or quantify the assay reaction which occurs or not in, on or against the production assay reactor. The assay machine may control at least one or several of the operating parameters for the assay reaction, including for example one or several of the timing, the reaction liquid flow rate, the degree of agitation, etc.

Being able to define an assay digital model applicable to a production assay, for a given set of defining features, will enable to check beforehand, by computation, with minimal experimental testing, if and how a given set of defining features can be selected for producing production assay reactors which will be used in production assays. Also, once an assay digital model applicable to a production assay has been determined, for a given set of defining features, it is possible, by mere computer simulation, to determine optimal operational parameter values to be used for a production assay, again with no or little experimental testing.

One aim of the methods and systems according to the invention is to compute the values of the characterizing parameters for the given set of defining features, these characterizing parameters being key elements of an assay digital model representative of the kinetics of the assay chemical reaction.

In the following, the invention will be described in relation to an exemplary embodiment where the assay chemical reaction is or comprises an antigen/antibody interaction.

Figure 1:
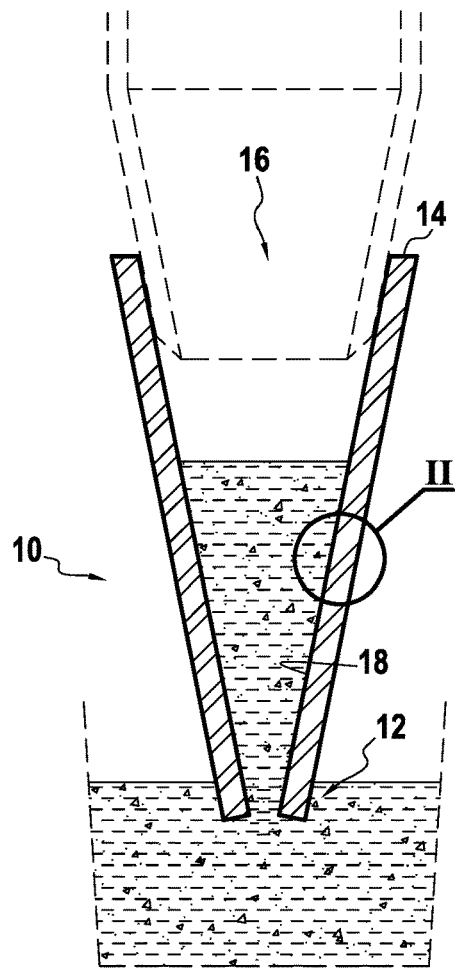
FIG. 1 represents an example of a production assay reactor used for an immunoassay.

FIG. 1 represents one example of a production assay reactor 10, here in the form of a cone. Such type of cone reactors are used in a production assay system known under the trademark VIDAS®, marketed by one of the applicants bioMérieux. The cone, which in use functions both as the extremity of a pipette and as a reaction chamber, is open at each end, at the bottom end 12 for fluid connection to one or several fluid wells, and at the top end 14 for connection to a pump. With the use of the pump, the system is able to aspirate a fluid from a fluid well into the cone, or to release a fluid from the cone into a fluid well. In use during a production assay, the system is operated in such a way that the open ended interior space 16 of the cone is able to receive and contain a fluid, typically a reaction fluid, and more precisely a liquid as reaction fluid. The production assay reactor 10 in the form of a cone is typically made of a synthetic polymeric material. For example, that material can be present on, or can form a conical internal solid surface 18 which is intended to be in contact with the reaction fluid when the reaction fluid is filled into the production assay reactor 10.

Figure 2:
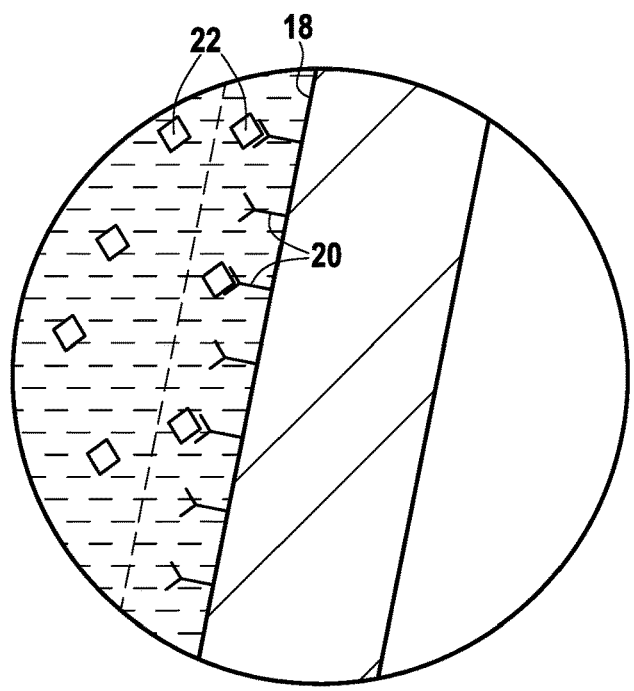
FIG. 2 represents a schematic enlargement of a portion of the production assay reactor of FIG. 1, illustrating the assay chemical reaction.

As shown in FIG. 2, the internal surface 18, or at least part thereof, is coated with a ligand species 20, for example an antibody. The coated part of the internal surface thus forms a reactive solid surface, where at least some of the ligands coated on the reactive solid surface have the capacity to bind with a corresponding analyte, here an antigen element 22 of an antigen species against which that antibody species is directed, according to a corresponding assay chemical reaction. It is to be noted that not necessarily all of the coated elements of the ligand species (here the antibodies) are effectively able to bind with an analyte (here an antigen), at least not under all operating conditions. It has been observed that, in most instances, only a fraction of the total population of elements of the ligands species, which are coated on the reactive solid surface, may effectively, under a given set of operating conditions, bind and retain a corresponding analyte element 22. Such elements of the ligand species may be called reactive elements of the ligand species, as opposed to non-reactive elements of the ligand species. That fraction of the reactive elements of the ligand species coated on the support material, versus the total population of elements of the ligand species coated on the support material, may vary with the analyte and ligand species, but also with the support material (composition, size, shape, and/or roughness, . . . ) and with the methodologies used for coating the ligands on the reactive solid surface.

An input to the method is thus a given set of defining features, including at least a given support material (composition, size, shape, and/or roughness, . . . ), a given ligand species, and a given analyte species. The defining features are thus known. Other defining features may exist, especially depending on the chemical assay reaction involved. For example, at least in some cases, temperature may be a defining feature. At least in some cases, a buffer (composition and/or concentration, . . . ) used in assay reaction may be a defining feature. In some cases, it is possible to classify the defining features into categories such as primary order defining features and secondary order defining features, depending for example on the magnitude of their impact on the performance of the assay. In some examples, the given support material, the given ligand species, and the given analyte species will be primary order defining features. In those cases, temperature may be a primary or a secondary defining feature. In those cases, a buffer used in assay reaction may be a secondary defining feature The method for computing the values of the characterizing parameters involves performing calibration experiments in a calibration tool. Typically, the set of defining features used in the calibration experiments are those which are contemplated for a production assay.

The method involves the use of an assay digital model, representative of the kinetics of the assay chemical reaction, which includes the characterizing parameters driving specific terms of the model, but the characterizing parameters being unknown. The characterizing parameters have values which depend on the given set of defining features. In the method, the values of the characterizing parameters for the given set of defining features are fitted, by computation in the electronic computer unit, based on a series of calibration experiment results acquired during the performance of the calibration experiments.

For a part of the methods according to the invention, the assay digital model will be used in a form applied to the calibration setup, or more generally in a form applied to the calibration experiments. In other words it will be used under a form applied to the values of the operating parameters applicable in the calibration experiments. In that form, it can be called an assay digital calibration model.

For other parts of at least some of the methods according to the invention, the assay digital model will be used in a form applied to a production assay setup, or more generally in a form applied to the production assay. In other words it will be used under a form applied to the values of the operating parameters applicable in the production assay. In that form, it can be called an assay digital production model.

In order to compute predicted characterizing parameters which are as close as possible to the characterizing parameters which would define the production assay performed in the production assay reactor, the calibration experiments are performed using discrete particles made of the same support material as the support material which is used or contemplated for a given existing or contemplated production assay reactor. The discrete particles are coated with the same ligand species as the one used or contemplated for the production assay, thus forming discrete reactive particles which are as close as possible, from a chemical point of view, to the reactive solid surface of the given production assay reactor. Preferably, the same methodologies are used for coating the ligand species on the discrete particles as the ones which are used or contemplated for the manufacturing of the given production assay reactor, and they will thus not be detailed hereunder.

A calibration experiment will thus typically involve providing, in the reaction chamber 28 described below, discrete particles including discrete reactive particles having a reactive solid surface made of the given support material on which a population of the given ligand species is coated.

In some experiments, it could be provided that some discrete particles provided in the reaction chamber are not coated with the given ligand species, thus not considered as reactive particles for the given assay reaction and could thus be called non-reactive particles. In such a case, the way the reactive and non-reactive particles are arranged together in the reaction chamber may be specified. For example, the reactive and non-reactive particles may be homogenously mixed in the reaction chamber. Alternatively, the reactive and non-reactive particles mixed in the reaction chamber may be arranged in separate layers or zones, with at least one separate layer or zone of only reactive particles, and/or with at least one separate layer or zone of only non-reactive particles.

The discrete reactive particles have a size and shape which are chosen in order to have a sufficient ratio of the reactive solid surface of the particles compared to the volume needed to contain those discrete reactive particles. Also, the ease of flow of the reaction fluid through the discrete reactive particles, when stacked in the calibration tool, can come into consideration when choosing the size and geometry of the discrete reactive particles.

Discrete reactive particles may be directly produced from production assay reactors, or from reactors made in the same way as production assay reactors. Typically, this would require cutting productions assay reactors into the particles.

In some case, discrete reactive particles have been produced by grinding production assay reactors. However, grinding can damage the coated ligands. Discrete reactive particles can be obtained by coating, with the given ligand species, discrete particles made of the given support material. If necessary, depending on the initial size of the particles, the initial particles may be ground, preferably before the coating process, so as to form final particles which can then be coated with the ligand species.

For example, in some embodiments, commercially available 3-4 mm diameter granules have been ground and sieved, and have been coated with ligand species after grinding. Such commercially available 3-4 mm diameter granules have been used under their original form, so that, after coating, 3-4 mm diameter particles have been obtained, for use in the calibration experiments.

All in all, the discrete reactive particles used in the calibration experiment exhibit a size, determined as the arithmetic mean, for a given set of particles used in a given calibration experiment, of the maximum dimension of each particle of the set, which is in the range of 0.01 millimeter to 50 millimeters, preferably in the range of 0.1 millimeter to 20 millimeters, most preferably in the range of 1 millimeter to 10 millimeters.

FIG. 3 represents schematically an example of some elements of an experiment set-up 24 of a system for measuring the values of one or several characterizing parameters representative of the kinetics of an assay chemical reaction between a given ligand species coated on a solid surface of a given support material and a given analyte species contained in a reaction fluid, which may be used for performing the calibration experiments.

This set-up comprises a calibration tool 26 comprising a reaction chamber 28.

It should be noted that one object of the invention is to provide a system for determining the defining features of a production assay reactor. Such system may typically include a calibration tool, an inlet system for injecting reaction fluid in the calibration tool, at least one sensor, and an electronic computer unit running a particular assay digital calibration model, the system being frugal in computing resources, for example in terms of processor power and/or memory space, for measuring the values of one or several characterizing parameters representative of the kinetics of an assay chemical reaction. Said system thus enables a user to quickly and robustly test multiple sets of defining features and to select one which enables manufacturing of a production assay reactor for the performance of assays suitable as production assays. Several machines, including a molding press and a coating machine may be implemented for effectively manufacturing the production assay reactors according to the thus determined defining features.

As shown in FIG. 3, the reaction chamber 28 of the calibration tool 26 forms a stirred-tank reactor. In a stirred tank reactor, it is provided that the fluid contained in the reaction chamber is stirred, with the consequence that the concentration of the different species which may be contained in the reaction chamber can be considered to be, at any given point in time, uniform across the entire reaction chamber. It will be seen that this feature will influence the assay digital calibration model which can be used in the method, by allowing using an assay digital calibration model which does not include spatial considerations. This feature allows thus the use of an assay digital calibration model requiring less computing power for a given accuracy and/or robustness of the method.

Various systems may be provided to cause the stirring of the fluid inside the reaction chamber. For example, as schematically shown on FIG. 3, the stirring may be caused by a mobile stirrer in the reaction chamber. As in the shown example, the mobile stirrer may comprise a magnetic bar 34 inside the reaction chamber 26 which is subjected to a rotating magnetic field created by a magnetic field generator 36 located in proximity to the reaction chamber 28. Alternatively, the mobile stirrer could be mechanically driven. The mobile stirrer could be one of the walls or other structure of the reaction chamber. Stirring of the fluid inside the reaction chamber could also be caused by a mobile fluid inlet of the reaction chamber or by subjecting the reaction chamber to vibrations, such as fitting the reaction chamber on a vibration plate.

Indeed, in a preferred embodiment, the reaction chamber 28 is in the form of a flow-through chamber, comprising a fluid inlet 30 for the reaction fluid and a fluid outlet 32.

With such a reaction chamber 28, it is possible to implement a calibration experiment in which the reaction fluid, having a known input concentration of the given analyte species, is injected in the flow-through chamber of the calibration tool, at the fluid inlet thereof. The known input concentration of the given analyte species may vary over time during a given calibration experiment, with a known time variation law.

In a calibration experiment, an output variable is measured, such as the concentration of the given analyte species in the fluid collected at the fluid output of the calibration tool 26.

However, in some embodiments, the reaction chamber may be a non-flow-through chamber, or closed chamber, where a quantity of reaction fluid is in the reaction chamber at the start of the experiment, and where the output variable is measured from time to time or continuously over time.

In the embodiment of FIG. 3, the reaction chamber 28 is thus a continuous-flow stirred-tank reactor.

Therefore, in the embodiment of FIG. 3, the experimental set-up 24 comprises at least one pump 38 which is able to pump reaction fluid contained in a reservoir 40 and to forward the reaction fluid through an inlet circuit 42 up to the fluid inlet 30 of the reaction chamber 28.

In the shown example, the same pump 38 is also able to pump a buffer solution contained in a secondary reservoir 44 and to forward the buffer solution through the same inlet circuit 42 up to the fluid inlet 30 of the reaction chamber 28. Thus, it is provided, in the inlet circuit 42, an upstream circuit 46 having a first upstream 48 branch connected to the reservoir 40 containing the reaction fluid, a second upstream branch 50 connected to the secondary reservoir 44, both upstream branches being connected each to one input port of a valve 52. The valve 52 has its output port connected, through a joint branch 54 of the upstream circuit 46, to an inlet port of the pump 38. The valve 52 may be a selector valve, connecting the joint branch 54 exclusively to one or the other of the upstream branches 48, 50, or a mixing valve able to proportionally mix the fluids coming from the upstream branches 48, 50.

An example of a calibration tool 26 which may be used in the method is shown more in detail in FIGS. 4 to 6.

In this example, the continuous-flow stirred-tank reactor comprises an internal volume, which defines the reaction chamber 28, which is physically divided into:

an input compartment 56, into which discharges the fluid inlet 30;
an output compartment 58, which discharges into the fluid outlet 32;
between the input compartment 56 and the output compartment 58, a reaction compartment 60 for receiving the discrete reactive particles.

Because the reaction chamber 28 is in the form of a flow-through chamber, it is configured so that the reaction fluid flows from the input compartment 56 to the output compartment 58 through the reaction compartment 60. For discrete reactive particles having shape and size causing only a minimal, if possible negligible, pressure drop of the reaction fluid through the compartment 60, and with a mobile stirrer located near the reaction chamber bottom, the reaction fluid should advantageously flow from the output compartment 58 to the input compartment 56 near the reaction chamber top. In some designs, a recirculation can be induced according to which a given fluid molecule flows several times through the reaction compartment 60 before flowing out of the reaction chamber 28 via the fluid outlet 32, which could increase the performances of the assay reaction.

As shown on FIGS. 4 to 6, the reaction compartment 60 may be separated from the input compartment 56, and from the output compartment 58, by a respective sieve 62, 64 configured to retain the discrete reactive particles but to allow through-flow of the reaction fluid. A sieve may be formed of a wall having perforations. The perforations for each sieve 62, 64 have each a cross section which inhibits passage of the discrete reactive particles, but which allows through-flow of the reaction fluid, including of course the analyte species. The number of perforations in a given sieve 62, 64 should be enough so that the combined cross-sections of the perforations of a sieve cause only a minimal, if possible negligible, pressure drop for the flow of reaction through the sieve. Also, the perforations are preferably spread evenly over the extension of a given sieve, so as to promote uniform flow from one compartment to the other over the whole extension of the sieve. This, in combination of the stirring of the reaction fluid, promotes uniformity of the concentration of the analyte species in the reaction fluid in the entirety of the reaction chamber 28 comprising the input compartment 56, the output compartment 58 and the reaction compartment 60.

In the depicted embodiment, the reaction compartment 60 is an annular compartment around the input compartment 56, and the output department 58 is an annular compartment around the reaction compartment 60.

More precisely, the reaction chamber 28 is delimited by an exterior peripheral wall 66 which is tubular, of circular cylindrical shape around a central axis A0, and by a top wall 68 and a bottom wall 70 both transverse to the central axis A0. The two sieves 62, 64 are received within the reaction chamber 28 and are each made by a perforated wall which is tubular, of circular cylindrical shape around a central axis A0. The sieves, including an inner sieve 62 and an outer sieve 64 of larger diameter than the inner sieve 64, are arranged concentrically and demarcate radially between them the reaction compartment 60. Preferably, each sieve 62, 64 extends along the axial direction of central axis A0 over the full height of the reaction chamber between top wall 68 and bottom wall 70. Preferably, for one sieve, or more preferably for both sieves, the perforations are also spread over the full height of the reaction chamber between top wall 68 and bottom wall 70. Preferably, for one sieve, or more preferably for both sieves, the perforations are also spread over the full 360 degrees of angular extension around central axis A0. As in the shown example, the fluid inlet 30 may advantageously be arranged in the center of the top wall 68, along central axis A0, so as to discharge directly into the input compartment 56, which is delimited inside the inner sieve 62. As in the shown example, the fluid outlet 32 may advantageously be arranged in the peripheral wall 66, along a direction perpendicular to the central axis A0, so as to discharge directly into the output compartment 58, which is delimited radially between the outer sieve 64 and the peripheral wall 66.

In the shown embodiment, the calibration tool 26 is constructed of three parts. The peripheral wall 66 and bottom wall 70 may be formed as a first single part. The top wall 68 may be formed as a second single part, forming a lid for the reaction chamber. The top wall 68 may be secured to the first single part by any suitable dismountable fastening means, such as screws, clips, etc. . . . .

In the shown embodiment, the sieves 62, 64 are removable from the reaction chamber 26. In the shown embodiment, the sieves 62, 64 are bound together so as to form a removable basket 72. The basket 72 thus comprises both sieves 62, 64 arranged in such a way to radially demarcate the reaction compartment 60, and comprises a bottom floor 74, extending in a plane transverse to central axis A0, and which may hold discrete reactive particles in the reaction compartment 60. The bottom floor 74 extends at least between the two sieves 62, 64. It could be an annular surface extending between the circular bottom edges of the two sieves. However, in the shown embodiment, the bottom floor 74 is a disk having the diameter of the outer sieve 64. In the shown embodiment, the basket is received in a recess 76 arranged on a top surface 76 of the bottom wall 70. The outline of the recess 76 matches the outline of the basket 72, here the outline of the bottom floor 74, in order to precisely fix the location of the basket 72 within the reaction chamber 28 along all directions. Along the direction of the central axis A0, the depth of the recess 76 is preferably equal to the thickness of the bottom wall 74 of the basket, thereby avoiding any obstruction of a lower part of the sieves.

In operation, for a calibration experiment, the basket may be inserted in the reaction chamber. Prior to that insertion, or after that insertion, discrete reactive particles may be provided in the reaction compartment 60. The top wall 68 may then be fastened to close the reaction chamber 28. Preferably, the reaction chamber 28 is made fluid-tight, with the exception of course of the provision of the fluid inlet 30 and fluid outlet 32, for example by providing a gasket at an interface between the peripheral wall 66 and the top wall 68.

In an exemplary embodiment, the walls 66, 68, 70 and the sieves 62, 64 of the reactor 28 are made of synthetic polymer material, such as polytetrafluoroethylene (PTFE).

The method involves performing, for the given set of defining features, a series of calibration experiments:
in which a reaction fluid, having a known input concentration of the given analyte species in the reaction fluid, is injected in the reaction chamber,
in which measurements are performed to produce calibration experiment results including, for a given calibration experiment, several measurements of at least one output variable, typically several measurements of the concentration of given analyte species in the reaction fluid, at different successive measurement times during said given calibration experiment,
and where, to obtain a series of calibration experiment results, different calibration experiments in a series are performed under different sets of values of at least one operating parameter.

The at least one operating parameter may vary between two different calibration experiments in a series. The at least one operating parameter may be selected in the list including the reaction fluid flow rate through the calibration tool, the input concentration of the given analyte species in the reaction fluid, the total area of the reactive solid surface of the support material in the reaction chamber, the total volume of the reactive solid surface of the support material in the reaction chamber, the total volume of the reaction fluid in the reaction chamber, the experiment duration and the stirring speed.

Typically, for a calibration experiment, the reaction fluid which is injected in the reaction chamber has a known input concentration of the given analyte species. This knowledge may derive directly or indirectly from the knowledge of the concentration of the given analyte species which is used, such for example as stored in reservoir 40. If a dedicated upstream circuit 46 is used for the reaction fluid, there is no reason that the concentration of the given analyte species in the reaction fluid would change between the reservoir 40 and the fluid inlet 30 into the reaction chamber 26. However, as exemplified by the experimental set-up of FIG. 3, the concentration of the given analyte species in the fluid inlet 30 into the reaction chamber 26 might be different from that of the fluid reservoir 40 in case of use of a partly shared upstream circuit 46.

In the example of FIG. 3, the set-up may have been previously used to inject, in the reaction chamber, a buffer solution contained in the secondary reservoir 44, the buffer solution having a known input concentration of the given analyte species which is null. During that time, the upstream circuit 46 is thus filled with the buffer solution. If the valve 52 is switched at a given time point so that now reaction fluid from the reservoir 40 is pumped, it will take some time for the fluid at the fluid inlet 30 to be that same reaction fluid. During a settling duration, the nature of the fluid provided by the upstream circuit 46 at the fluid inlet 30 of the reactions chamber will more or less progressively change from being purely the buffer solution to being a purely or substantially purely fluid having the same composition as the fluid stored in reservoir 40. The reverse would be true when switching from the reaction fluid stored in the reservoir 40 to the buffer solution stored in secondary reservoir 44. In such a case, there are nevertheless different manners to be able to know the input concentration of the given analyte species in the fluid at the fluid inlet 30. One manner may be to directly make measurements of said concentration at the fluid inlet, or very near therefrom. Another manner is to predict said concentration at the fluid inlet. It is possible to simply make preliminary measurements to establish an empirical law which may for example express a time variation of the composition of the fluid at the fluid inlet following a switch from one fluid to another fluid. For example, the system may be subject to preliminary measurements to establish the empirical law expressing the time variation of the electric conductivity of the fluid at the fluid inlet following a switch from a first test fluid having a first electric conductivity to another a second test fluid having a second electric conductivity fluid. The same variation law can be then transposed for establishing a predicted variation law of the input concentration of the given analyte species in the fluid at the fluid inlet 30. Another manner to predict said concentration at the fluid inlet is to provide a digital model taking into account the fluid hydrodynamics in the upstream circuit 46. Such digital model may be obtained by pure theory, or may be refined by taking into account test measurements. Such digital model would then be included in the assay digital calibration model.

The measurement of the output variable(s) may involve direct or indirect measurement of a physical or chemical parameter of a fluid collected in the reaction chamber or downstream of the reaction chamber.

For a given calibration experiment, the calibration results include such several measurements. The several measurements may constitute a continuous measurement, which term would include a quasi-continuous measurement where measurements are made at a high frequency compared to the possible variation of the output variable, during a part or the entirety of the calibration experiment. The several measurements may be made at a lower frequency compared to the possible variation of the output variable, thus being made from time to time along a part or the entirety of the calibration experiment. In many cases, the several measurements in a given calibration experiment illustrate a time-variation of the measured output variable. Such time variation can be illustrative of the kinetics of the chemical assay reaction.

The calibration results may be limited to such several measurements of the one or several output variable(s), or may include other information.

Typically, one output variable which may be measured, directly or indirectly, during a calibration experiment is the concentration of the given analyte species, or at least of a marker thereof, in the reaction chamber. It can be remembered that, in a stirred-tank reactor, the concentration of the given analyte species can be considered as being uniform in the reaction chamber, so that fluid collected at a fluid outlet of the reaction chamber has the same concentration of the given analyte species as the fluid in the reaction chamber.

In some instances, the output variable may be measured directly in the reaction chamber, for example by using one or more sensors in the reaction chamber, or by sampling fluid from the reaction chamber, and the output variable in the fluid sample may be measured in a standalone machine 80, similarly to what will be described below.

The output variable may be measured directly at the fluid outlet 32 of the reaction chamber 28, or it may be measured downstream from the fluid outlet 32.

In the experimental setup of FIG. 3, the calibration tool 26 is connected to a downstream circuit 78 for collecting fluid exiting from the reaction chamber. The downstream circuit 78 has an upstream terminal connected to the reaction chamber at the fluid outlet 32. Measurement of the output variable, which typically involves direct or indirect measurement of a physical or chemical magnitude of the fluid, may thus be performed in such a downstream circuit 78, at a distance from the fluid outlet 32 of the reaction chamber 28, for example at a downstream collection terminal.

Similarly to what has been described above regarding the knowledge of the input concentration, it may be necessary, depending on the chemical assay reaction, and depending on the experimental set-up (especially on the design of any downstream circuit 78), to take into account any effect of the downstream circuit 78, for example by taking into account any time delay induced on the measurement of the output variable by the experimental set-up. This may involve predicting this effect. Such prediction may rely on preliminary measurements to establish an empirical law, and/or may rely on a digital model of the fluid hydrodynamics in the downstream circuit 78, which digital model may be obtained by pure theory or may be refined by taking into account test measurements. Such digital model may describe the link between, on the one hand, the concentration of the analyte species in the fluid at the upstream terminal connected to the reaction chamber, and, on the other hand, the concentration of the analyte species in the fluid at the downstream collection terminal. Such digital model would then be included in the assay digital calibration model.

Typically, measurements of the output variable(s) will be made using one or several sensor(s). Such sensors can be directly integrated in the experimental set-up, for example integrated in the calibration tool 26 and/or in the downstream circuit 78. Some or all of the sensors used for measuring the output variable(s) can be part of a standalone machine 80, as in the example of FIG. 3.

Indeed, in the calibration experiments conducted by the applicants, measurements of the output variable, which was in this case the concentration of the given analyte species in the reaction fluid, were made with a machine for detecting and/or quantifying at least one analyte present in a sample, by performing optical analysis, in particular by fluorimetry and/or colorimetry.

Such machines are known, in particular under the form of automatic instruments for in vitro diagnostic by fluorimetry, e.g. as disclosed in documents EP 0 864 089 B1, EP 0 871 863 B1, EP 0 241 268 A1, U.S. Pat. No. 5,757,013 A, EP 0 802 413, and WO 2004/055502 A2. Furthermore, one of the applicants bioMérieux sells machines on these principles under the trade name VIDAS®. Such machines typically comprise:

one or more reception zones each for receiving a sample for analysis;

preparation and automatic reaction means that serve to prepare the sample and cause it to react with reagents in order to form a measurement solution;

one or several optical analysis zones, each for receiving a measurement solution obtained by reaction with a sample; and an optical sensor device capable of detecting and/or quantifying the optical response of the measurement solution to an electromagnetic stimulation, the optical sensor device comprising both at least one source of electromagnetic radiation capable of illuminating an analysis zone, and also a photoelectric receiver arranged to receive light radiation coming from the measured solution contained in the analysis zone and capable of detecting the optical response of the measured solution.

Such machines typically comprise an integrated electronic computer unit which may include a computer memory storing instructions for implementing a measurement algorithm and a microprocessor unit for executing said instructions in order to determine the value of the output variable as a function of parameters including the optical response of the measurement solution. An integrated electronic computer unit is for example a desktop computer or a laptop computer. The measurement results may be stored electronically in the integrated electronic computer unit and/or displayed on a screen, with which the machine is provided, for example. In a variant, part or all of the measurement algorithm may be performed in a separate electronic computer unit 82 which may be connected to the machine 80 by wire or wireless communication.

In the experimental set-up of FIG. 3, the downstream circuit 78 is designed to allow collection, from time to time, of a sample from the flow of fluid which is collected from the reaction chamber at the fluid outlet 32. The downstream circuit 78 comprises for example a tubing leading to an input port of a switch valve 84. In that tubing, upstream from the switch valve 84, a flow restrictor 86 can be provided. The switch valve 84 may have two output ports, one being connected to a sampling outlet 90 and the other one being connected to a discharging outlet 92. During a calibration experiment, the flow of fluid is delivered to the reaction chamber by pump 38, at a flow rate which may be regulated by the flow pump 38 in combination with the flow restrictor 86. Thus a flow rate of fluid is discharged from the reaction chamber through the fluid outlet 32 into the downstream circuit 78. During operation, the switch valve 84 may direct the flow to the discharging outlet 92. From time to time, the switch valve 84 may be switched momentarily to direct the flow of fluid towards the sampling outlet 90 where a defined volume of fluid may be collected in a receptacle 94. The fluid collected in the receptacle 94 may then be used for the measurement in the measurement machine 80. The sampling outlet 90 thus forms a downstream collection terminal at which a concentration of the analyte species in the collected fluid is measured. However, in the setup of FIG. 3, the only consequence of the downstream circuit on the output variable is considered to be a potential time delay between a potential variation of the output variable at the fluid outlet 32 of the reaction chamber, and the corresponding variation of the output variable at the downstream collection terminal 90. In some cases, especially if the downstream circuit 78 is short enough, such potential time delay can be small enough to be ignored.

FIGS. 7A to 7D represent plots of a series of calibration experiment results versus time. Each of these figures represents the calibration experiment results for one calibration experiment in a series. These calibration results for one calibration experiment include several measurements made from time to time, each measurement being represented by a dot on the figure. For example, the calibration results are expressed as a normalized analyte species concentration in the fluid at the fluid outlet of the reaction chamber.

Figure 7A:
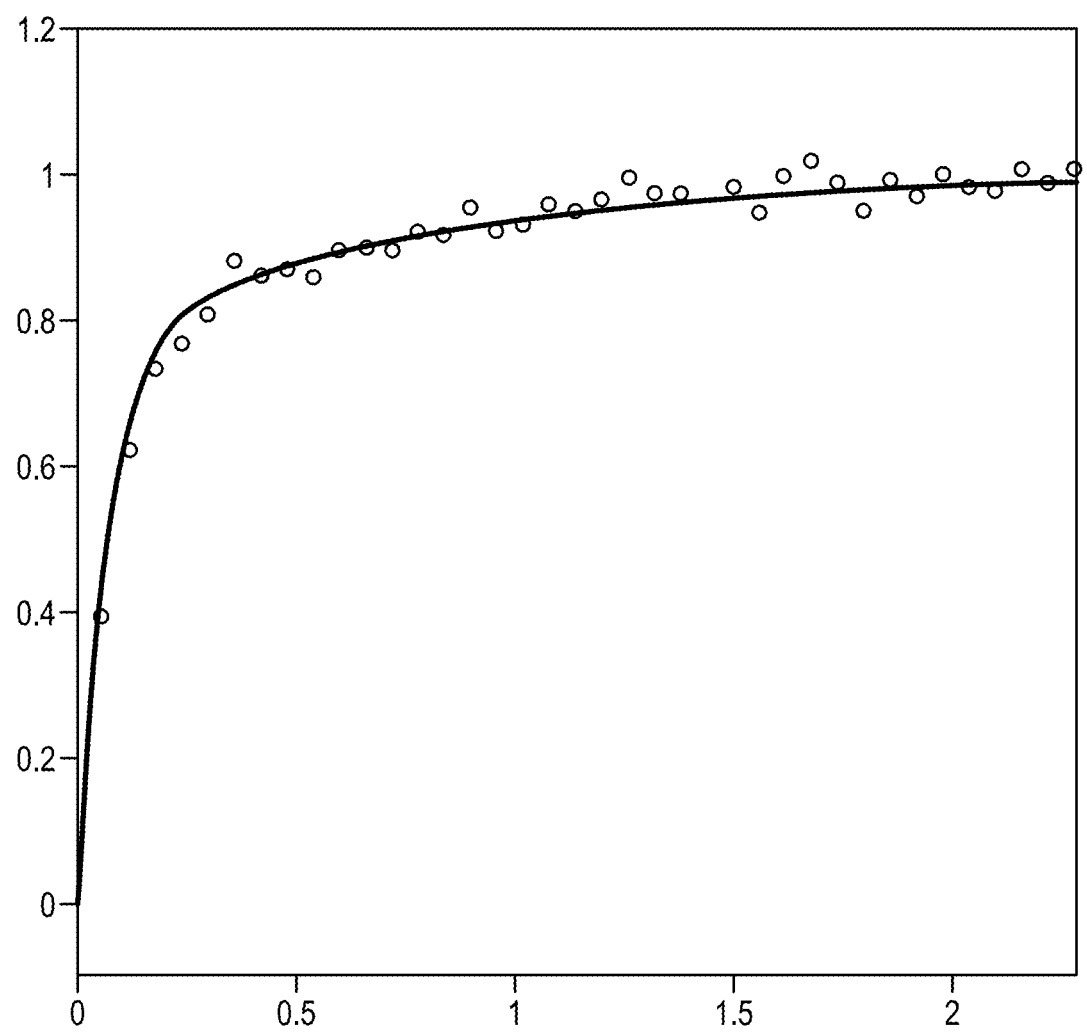
Figure 7B:
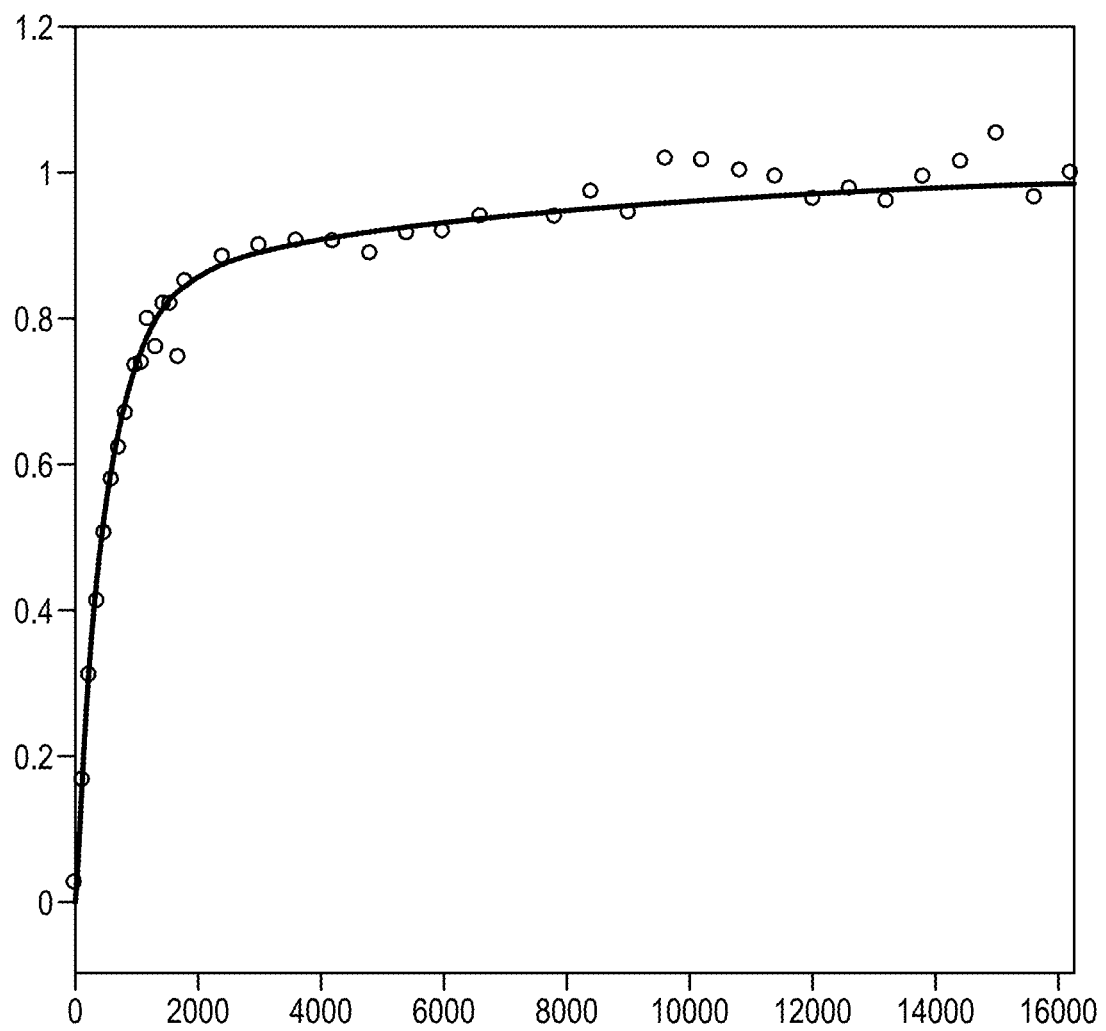

FIGS. 7A and 7B are exemplary of the type of calibration experiments called breakthrough experiment where a reaction fluid, having a known constant input concentration of the given analyte species which is not null, is injected in the reaction chamber from an initial time point t=0. The plots thus show, versus time, a progressive increase in the measured concentration of the given analyte species in the fluid at the fluid outlet 32. These two figures show that the various experiments are performed under different operating conditions, here under different flow rates of the reaction fluid through the reaction chamber, but also possibly under differing initial conditions.

Figure 7C:
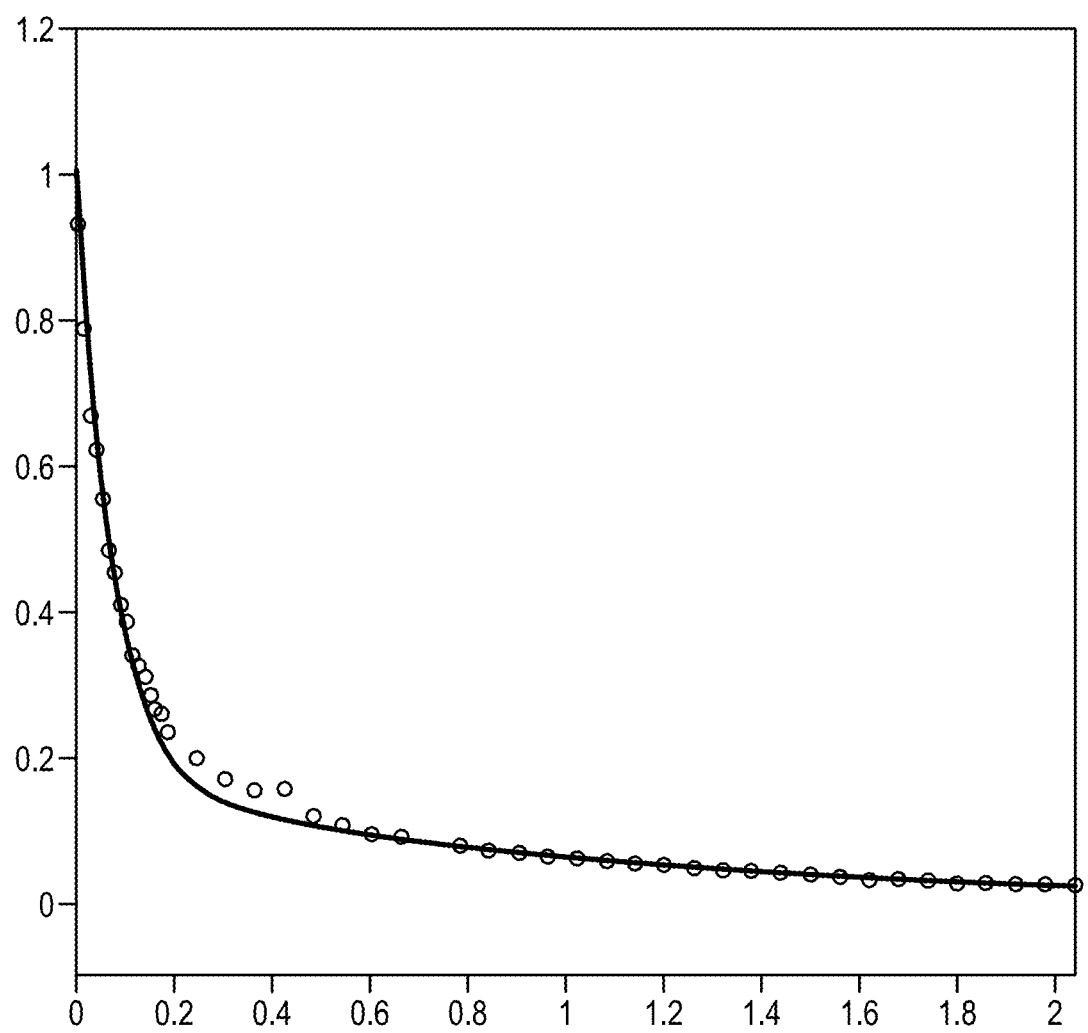
Figure 7D:
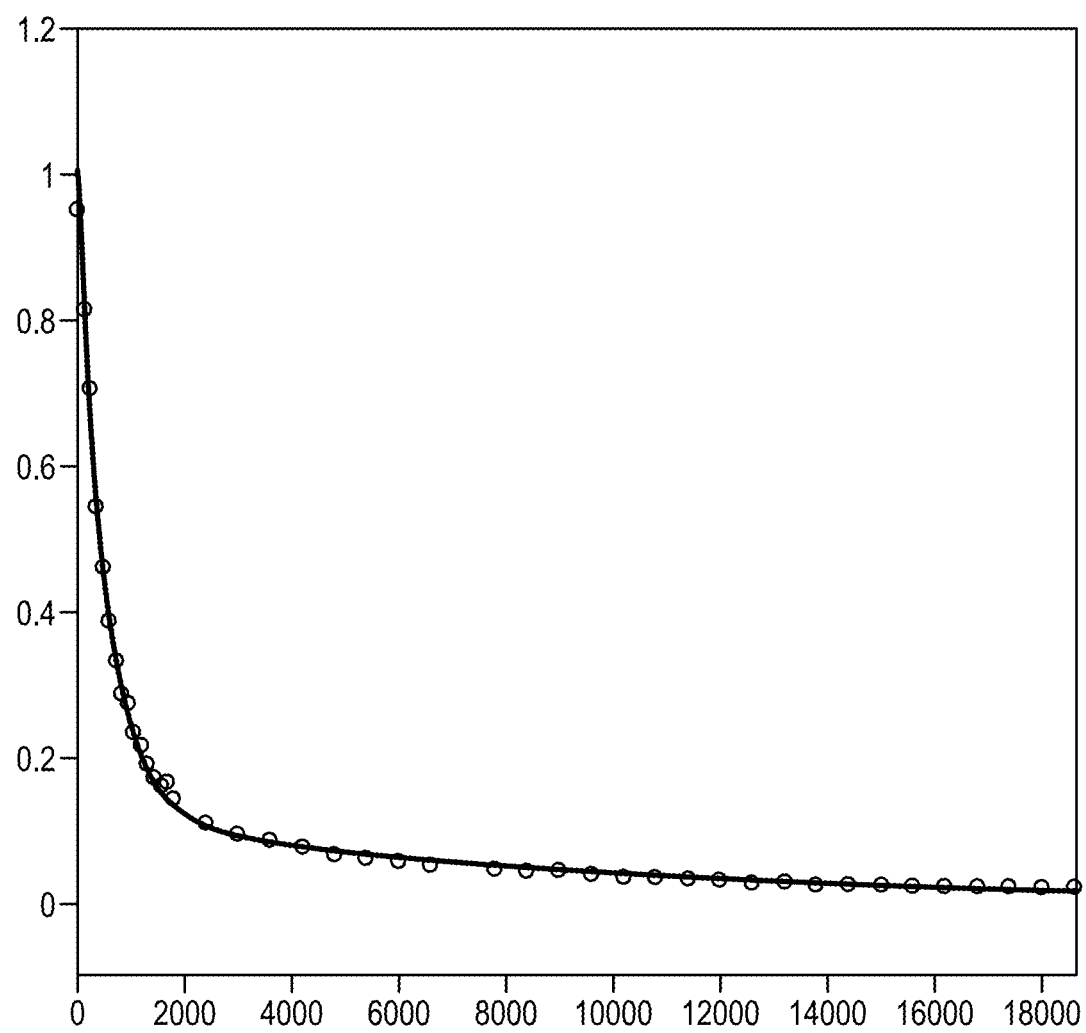

FIGS. 7C and 7D are exemplary of the type of calibration experiments called purge experiment where the calibration experiment is performed with a reaction fluid, having a known input concentration of the given analyte species which is null, injected in the reaction chamber from an initial time point t=0. In other words, in this experiment, the reaction fluid may be the buffer solution. A purge experiment is typically performed after a breakthrough experiment during which elements of the analyte species will have bound to the reactive elements of the ligand species coated on the reactive support surface, preferably to a degree where the reactive elements of the ligand species are saturated with bound analyte species.

Preferably, in the series of calibration experiments for the given set of defining features, at least one of the calibration experiments is a purge experiment, and at least one of the calibration experiments is a breakthrough experiment.

As discussed above calibrations experiments are performed with different values of at least one operating parameter. For example, one operating parameter can have a first value in one calibration experiment of a series, and another value in another calibration experiment of the same series. In another example, one operating parameter can have a fixed value in one calibration experiment of a series, and a varying value in another calibration experiment of the same series. For example, the input concentration of the reaction fluid can have, in at least one of the calibration experiments in the series, a varying value during the duration of the calibration experiment. However, two or more calibration experiments can be performed with the same set of operating parameters. For example, several experiments could be performed with the same input concentration of the given analyte species in the reaction fluid, and the same total area of the reactive solid surface of the support material in the reaction chamber.

For example, FIG. 7A and FIG. 7B correspond to two calibration experiments performed with sets of operating parameters which differ by a reaction fluid flow rate through the calibration tool being respectively of 5 mL·min$^{-1}$ and of 7 mL·min$^{-1}$. FIG. 7C and FIG. 7D correspond to two calibration experiments performed with sets of operating parameters which differ by a fluid flow rate, here a buffer fluid flow rate, thus having an input concentration of the given analyte species in the fluid which was null, through the calibration tool being respectively of 5 mL·min$^{-1}$ and of 7 mL·min$^{-1}$.

According to the invention, the calibration experiment results are used for computing the values of the characterizing parameters of an assay digital calibration model such that the assay digital calibration model, with the computed values of the characterizing parameters, is able to provide the values of the output variable for the given set of defining features defining the chemical reaction assay in the context of the calibration experiments, including the operating parameters applicable in the calibration experiments.

This part of the process is typically performed in an electronic computer unit. The electronic computer unit could be integrated in the measurement machine 80 discussed above, or could be a separate electronic computer unit 82, e.g. a desktop computer or a laptop. Such electronic computer unit may have a computer memory storing all of the parameters and instructions needed for implementing said steps of the method, including the digital model(s), at least the assay digital calibration model. The results of the method, including the computed characterizing parameters and the digital model(s) including these computed characterizing parameters may be stored in the electronic computer unit and/or displayed on a screen and/or provided on a removable data storage (USB stick, flash memory card, etc.) and/or electronically transmitted to a further electronic computer unit by wired or wireless communication (Ethernet, Internet, Wi-Fi®, Bluetooth®, etc.).

The computation of the values of the characterizing parameters for the given set of defining features may be performed by a fitting function, based on the series of calibration experiment results.

For example, the characterizing parameters may be computed by a fitting function minimizing the difference between experimental data, obtained through the experimental set-up, and simulated data, computed with the assay digital calibration model using initial characterizing parameter values. Such a fitting method may comprise a nonlinear least squares fitting method and trust-region-reflective algorithm. The experimental data comprises the calibration experiments results $\psi_{f,exp}(t=t_{exp,i})$. The simulated data comprises simulated values of the output variable(s) $\psi_f(t=t_{exp,i})$ obtained with the assay digital calibration model, taking into account the same given defining features and the same set of operation parameters used for the calibration experiments. For example the following criteria may be used, where the sum of square errors is minimized:

$$D(P) = \sum_{i=1}^{N_{exp}} (\psi_{f,exp}(t=t_{exp,i}) - \psi_f(t=t_{exp,i}))^2$$

in which:
- $t_{exp,i}$ are the experimental time points at which the outlet variable values have been measured during the calibration experiments.
- P is the vector of characterizing parameters which need to be computed and $N_{exp}$ is the number of experimental points.

Confidence intervals of $P_{estim}$, the estimated vector of parameter, can be evaluated according to the following formula:

$$P_{estim,j} - t_{stud}\sqrt{V_{jj}\sigma_P^2} < P_j < P_{estim,j} + t_{stud}\sqrt{V_{jj}\sigma_P^2}$$

where:
- $\sigma_P^2$ is the variance and can be estimated by dividing the sum of square errors by the degrees of freedom (the difference between $N_{exp}$ and $N_P$ the number of characterizing parameters):

$$\sigma_P^2 = \frac{D(P_{estim})}{N_{exp} - N_P}$$

$t_{stud}$ is a variable following the Student distribution with $N_{exp}$-$N_P$ degrees of freedom and $V_{ij}$, the element of i-th line and j-th column of the variance matrix, is defined as follows:

$$V_{ij} = \left\{\frac{H^{-1}}{2}\right\}_{ij}$$

with H the Hessian matrix:

$$H = \left\{\frac{\partial^2 D(P_{estim})}{\partial P_i \partial P_j}\right\}_{ij}$$

Correlation between estimated parameters can be evaluated. $Corr_{ij}$ is the correlation coefficient between $P_{estim,i}$ and $P_{estim,j}$ and is given by the formula:

$$Corr_{ij} = \frac{V_{ij}}{\sqrt{V_{ii}V_{jj}}}$$

One characterizing parameter of the assay digital model, thus of the assay digital calibration model, which is fitted by computation based on the series of calibration experiment results, can be representative of a concentration $C_{s,\,max}$ of reactive elements of the ligand species coated on the support material, per volume of support material or per area of the reactive solid surface of the support material. Such concentration $C_{s,\,max}$ of reactive elements of the ligand species coated on the support material, per volume of support material or per area of the reactive surface of the support material, may be approximated as being a maximum concentration of analyte species bound to a ligand element coated on the support material, per volume of support material or per area of the reactive solid surface of the support material.

Another characterizing parameter of the assay digital model thus of the assay digital calibration model, which may be fitted by computation based on the series of calibration experiment results, is an intrinsic association rate constant $k_a$ of the assay chemical reaction. Intrinsic means the convection and diffusion rates do not affect the estimated value of the kinetic parameter.

Indeed, the assay chemical reaction which involves the binding of an analyte species A to a ligand species B can, as an example, be described by a one-to-one interaction model that is often represented as follows:

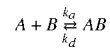

The intrinsic association rate constant $k_a$ of the assay chemical reaction, which may be expressed in m³·mol⁻¹·s⁻¹, is representative of a rate of association $r_{ads}$ of the assay chemical reaction, indicative of a number of elements of the analyte species binding with the ligand species according to the assay chemical reaction on the considered support material, per volume of support material or per area of the reactive solid surface of the support material, and per unit of time. In a stirred-tank reactor, and taking into account a "thin film" model for mass transport as will be described below, the intrinsic association rate constant $k_a$ of the assay chemical reaction is linked to the rate of association $r_{ads}$ (which may be expressed in the example in mol·m⁻³·s⁻¹) of the assay chemical reaction by the relationship:

$$k_a C_{int}(t)(C_{s,max} - C_s(t)) = r_{ads}(t)$$

where:
- $C_{int}(t)$ is a concentration of analyte species in a thin volume of reaction fluid contacting the reactive solid surface (the volume defined by a so-called "thin film" in the "thin film" model, as discussed below), per volume of fluid;

$C_s(t)$ is a concentration of analyte species bound to reactive elements of the ligand species, per volume of support material (as in the example) or per area of the reactive solid surface of the support material;

$C_{s,\,max}$ is the concentration of reactive elements of the ligand species coated on the support material, per volume of support material (as in the example) or per area of the reactive solid surface of the support material.

Still another characterizing parameter of the assay digital model, thus of the assay digital calibration model, which may be fitted by computation based on the series of calibration experiment results, is the intrinsic dissociation rate constant $k_d$ of the assay chemical reaction, as shown above. Such intrinsic dissociation rate constant $k_d$ of the assay chemical reaction is expressed in $s^{-1}$, and it is representative of a rate of dissociation $r_{des}$ of the assay chemical reaction, indicative of number of elements of the analyte species dissociating from the ligand species according to the assay chemical reaction on the considered support material, per volume of support material or per area of the reactive solid surface of the support material, and per unit of time. In a stirred-tank reactor, the intrinsic dissociation rate constant $k_d$ of the assay chemical reaction is linked to the rate of dissociation $r_{des}$ (which may be expressed in the example in $\text{mol·m}^{-3}\cdot s^{-1}$) of the assay chemical reaction by the relationship:

$$k_d C_s(t) = r_{des}(t)$$

where $C_s(t)$ is a concentration of analyte species bound to ligand per volume of support material (as in the example) or per area of the reactive solid surface of the support material.

It is to be noted that, at an equilibrium, as assumed in a Langmuir adsorption model, the rate of dissociation $r_{des}$ and the rate of association $r_{ads}$ of the assay chemical reaction may be considered to be equal:

$$r_{des}(t) = r_{ads}(t).$$

Typically, the assay digital calibration model used in a method according to the invention can include:

an expression of the mass balance of the analyte species in the reaction fluid in the reaction chamber, and an expression of the mass balance of the analyte species bound to a ligand element coated on the support material.

Thanks to the use of a stirred-tank reactor in the calibration experiments, both of these expressions, i.e. the expression of the mass balance of the analyte species in the reaction fluid, and the expression of the mass balance of the analyte species bound to a reactive element of the ligand species coated on the support material, can be expressed in relation to time, but without the need to take into account the location in the reaction chamber. Indeed, this means that the expression of the mass balance of the analyte species in the reaction fluid can be expressed considering that the concentration of the analyte species in the reaction fluid is, at a given time point, uniform, thus having the same value, throughout the reaction chamber, at least outside a thin volume of fluid contacting the reactive solid surface, but possibly varying in time. This leads to an important simplification of the assay digital calibration model for a given accuracy and a given robustness of the process.

As will be apparent below, both of these expressions may each be expressed in the form of a differential equation, respectively of a function representing the concentration of analyte species in the reaction fluid and of a function representing the concentration of the analyte species bound to a ligand element coated on the support material.

Therefore, in view of the above, in the proposed methods, the assay digital calibration model may include an expression of the mass balance of the analyte species in the reaction fluid which includes:

for a flow-through chamber, an expression of the flux of analyte species in the reaction fluid through the flow-through chamber, i.e. of the balance between the flux of analyte species flowing in and out the flow-through chamber, the flux being represented by the amount of analyte species per unit of time. Such expression of the flux in terms of mass balance can for example be under the form $f\,C_f(t)$;

an expression of the time variation of concentration of analyte species in the reaction fluid, per volume of reaction fluid, which can for example be expressed in terms of mass balance under the form $$V_f \frac{dC_f(t)}{dt};$$

an expression of the flux of analyte species between the population of analyte species remaining in the reaction fluid and the population of analyte species bound to an element of the ligand species coated on the support material. Such expression of the flux in terms of mass balance can for example be under the form $N_{ech}(t)S_{ech}$.

The flux $N_{ech}(t)$ of analyte species, between the population of analyte species remaining in the reaction fluid and the population of analyte species bound to an element of the ligand species coated on the support material, can be determined according to a so-called "thin film model" to describe mass transfer processes. Indeed, before binding to ligands, analytes must first be transported to the solid reactive surface. It has been shown that when a fast analyte/ligand association rate occurs, the global association process can be limited by the transport of analyte to the solid surface. Similarly, if dissociation between analyte and ligand is fast, the dissociation process can be limited by the transport of analyte away from the solid surface. When mass transport limitation cannot be avoided because of experimental constraints, a model including mass transport is thus preferable.

A simple model can be used to take into account mass transfer: the so-called "thin-film model". This model divides the volume occupied by the reaction fluid in the reaction chamber into the concepts of:

an inner compartment close to the reactive solid surface (the so-called "thin-film") which exhibits a volume concentration of analyte species $C_{int}(t)$ ($\text{mol·m}^{-3}$), an outer compartment, i.e. the rest of the reaction chamber, which has thus a much bigger volume and thus contains the bulk of the reaction fluid in the reaction chamber and which exhibits a volume concentration of analyte species $C_f(t)$ ($\text{mol·m}^{-3}$)

In the model, a two-step process is considered:

the first step is the transport of analyte species to the reactive solid surface and is characterized by a mass transport coefficient $k_M$, the second step is the binding of analyte with immobilized ligand characterized by the intrinsic association and dissociation rate constants $k_a$ and $k_d$.

In such a model, flux $N_{ech}(t)$ of analyte species between the population of analyte species remaining in the reaction fluid and the population of analyte species bound to an element of the ligand species coated on the support material is considered to be proportional to a difference between the concentration $C_f(t)$ of the analyte species in the bulk of the reaction fluid, thus outside the inner compartment which is the thin-film volume of reaction fluid contacting the reactive solid surface, and the concentration $C_{int}(t)$ of the analyte species in that thin-film volume of reaction fluid contacting the reactive solid surface (inner compartment). This proportionality can thus be expressed under the form:

$$N_{ech}(t) = k_M(C_f(t) - C_{int}(t))$$

Because the volume of the inner "thin-film" compartment close to the reactive solid surface is defined as being very small compared to the total volume of the reaction chamber, it is assumed that it does not accumulate analyte. It can thus be assumed that the following equation applies:

$$N_{ech}(t)S_{ech} = r_{ads}(t)V_s - r_{des}(t)V_s$$

where:
$N_{ech}$ (t is expressed in $mol \cdot m^{-2} \cdot s^{-1}$,
$V_s$ is the total volume of the discrete reactive particles immersed in the reaction fluid in the reaction chamber;
$S_{ech}$ is the area of the reactive solid surface;
$k_M$ is the mass transport coefficient;
$r_{ads}(t)$ is the rate of association of the assay chemical reaction, expressed in $mol \cdot m^{-3} \cdot s^{-1}$;
$r_{des}(t)$ is the rate of dissociation of the assay chemical reaction, expressed in $mol \cdot m^{-3} \cdot s^{-1}$.

Thus, an expression of the mass balance of the analyte species in the reaction fluid can for example be expressed under the form:

$$fC_e(t) = fC_f(t) + V_f \frac{dC_f(t)}{dt} + N_{ech}(t)S_{ech}$$

with f the volumetric fluid flow rate ($m^3 \cdot s^{-1}$) of the reaction fluid through the reaction chamber, $N_{ech}$ the flux of analyte species between the population of analyte species remaining in the reaction fluid and the population of analyte species bound to an element of the ligand species coated on the support material ($mol \cdot m^{-2} \cdot s^{-1}$), $S_{ec}$ the area of the reactive solid surface in the reaction chamber ($m^2$) and $V_f$ the volume of reaction fluid in the reaction chamber ($m^3$) that is assumed to be constant.

$C_e(t)$ is the volume concentration of analyte species in the reaction fluid at the fluid inlet 30 of the reaction chamber ($mol \cdot m^{-3}$). As discussed above, if the calibration tool comprises an upstream circuit for delivering the reaction fluid at the reaction chamber, the assay digital calibration model may include a digital model for estimating the concentration $C_e(t)$ of the analyte species in the reaction fluid at the fluid inlet of the reaction chamber.

This expression of the mass balance of the analyte species in the reaction fluid can be rewritten as follows:

$$\frac{dC_f(t)}{dt} = \frac{1}{t_0}(C_e(t) - C_f(t)) - N_{ech}(t)\frac{S_{ech}}{V_f}$$

with $$t_0 = \frac{V_f}{f}$$

being a time constant characteristic of flow.

Also in view of the above, the assay digital calibration model may include an expression of the mass balance of the analyte species bound to a ligand element coated on the support material which includes:
an expression of the time variation of the concentration of analyte species bound to reactive elements of the ligand species, per volume of support material or per area of the reactive solid surface of the support material, which can for example be expressed, in terms of mass balance, under the form $$V_s \frac{dC_s(t)}{dt};$$

an expression of the flux of analyte species between the population of analyte species remaining in the reaction fluid and the population of analyte species bound to an element of the ligand species coated on the support material, which can for example be expressed, in terms of mass balance, under the form $N_{ech}(t)S_{ech}$;
where $C_s$ is the volume concentration of analyte species bound to reactive elements of the ligand species ($mol \cdot m^{-3}$) and $V_s$ is the total volume of the discrete reactive particles immersed in the reaction fluid in the reaction chamber ($m^3$).

Considering that $C_f(t)$ is homogeneous in the tank, $C_s(t)$ is also considered homogeneous. The mass balance of analyte species bound to ligand species in the reaction chamber can be expressed by the equation $$V_s \frac{dC_s(t)}{dt} = N_{ec}(t)S_{ech}$$

Using the previous equations, it is possible to derive the following equation:

$$\frac{k_M(C_f(t) - C_{int}(t))S_{ech}}{V_s} = k_a C_{int}(t)(C_{s,ma} - C_s(t))V_s - k_d C_s(t)$$

$C_{int}$ can be eliminated from this expression as a function of $C_f$ and $C_s$:

$$C_{int}(t) = \frac{C_f(t) + \frac{k_d V_s}{S_{ec} k_M} C_s(t)}{1 + \frac{k_a V_s}{S_{ech} k_M}(C_{s,max} - C_s(t))}$$

The expression of the mass balance of the analyte species in the reaction fluid can be rewritten into:

$$\frac{dC_f(t)}{dt} = \frac{1}{t_0}(C_e(t) - C_f(t)) - \frac{S_{ech} k_M}{V_f}\left(C_f(t) - \frac{C_f(t) + \frac{k_d V_s}{S_{ec} k_M} C_s(t)}{1 + \frac{k_a V_s}{S_{ech} k_M}(C_{s,max} - C_s(t))}\right)$$

The expression of the mass balance of the analyte species bound to a ligand element coated on the support material becomes:

$$\frac{dC_s(t)}{dt} = \frac{S_{ech}k_M}{V_s}\left(C_f(t) - \frac{C_f(t) + \frac{k_d V_s}{S_{ec}k_M}C_s(t)}{1 + \frac{k_a V_s}{S_{ech}k_M}(C_{s,max} - C_s(t))}\right)$$

The equations above described contain many parameters to be estimated by fitting to experimental data.

It is proposed to use a change in variables by using a first dimensionless variable $\psi_f(t)$ such that $$\psi_f(t) = \frac{C_f(t)}{C_{adim}}$$

where $C_{adim}$ is a reference concentration and $C_f(t)$ is the concentration of the analyte species in the bulk of the reaction fluid in the reaction chamber outside said thin volume of reaction fluid contacting the reactive solid surface. $C_{adim}$ can be connected to a capacity of the measuring instrument which is used for measuring concentration in the calibration experiments. It can for example be the maximum concentration which the instrument can measure. As another example, it can be the concentration of the given analyte species in the reaction fluid at the fluid inlet 30 of the reaction chamber when a breakthrough experiment is performed. In both of these examples, this has the consequence that $\psi_f(t)$ has a value which is comprised in the range from 0 to 1.

It is also proposed to use a second dimensionless variable $$\psi^*(t) = \frac{C^*(t)}{C_{adim}},$$

where $C^*(t)$ is the theoretical concentration of the analyte species in a fluid that would be at equilibrium with the reactive solid surface at each time and position according to the Langmuir model, such that $$\frac{C_s(t)}{C_{s,max}} = \frac{k_a}{k_d}\frac{C^*(t)}{1 + \frac{k_a}{k_d}C^*(t)}$$

where, as stated above, $C_s(t)$ is the concentration of analyte species bound to ligand per volume of support material or per area of the reactive solid surface of the support material.

An advantage of the change of variable is that, if the initial conditions of the calibration tool correspond to an equilibrium state before an inlet step concentration is applied, the entire initial concentration profiles can be measured since in this case:

$$C^*(t=0) = C_f(t=0)$$

This is a great advantage since the initial equilibrium condition $$\frac{C_s(t=0)}{C_{s,max}} = \frac{k_a}{k_d}\frac{C_f(t=0)}{1 + \frac{k_a}{k_d}C_f(t=0)}$$

does not need to be included in the parameter estimation procedure when the initial conditions are not zero.

By using such change of variables, an expression of the mass balance of the analyte species in the reaction fluid may be written with the following terms:

$$\frac{\partial \psi_f(t)}{\partial t} = \frac{1}{t_0}(\psi_e(t) - \psi_f(t)) - \frac{V_s}{V_f}\frac{k_a C_{s,max}(\psi_f(t) - \psi^*(t))}{1 + \frac{k_a}{k_d}C_{adim}\psi^*(t) + t_M k_a C_{s,max}}$$

where $$t_0 = \frac{V_f}{f}$$

is a time constant characteristic of the flow of the reaction fluid in the reaction chamber, with $V_f$ the volume of reaction fluid in the reaction chamber and f the flow rate of fluid through the reaction chamber;

$$\psi_e(t) = \frac{C_e(t)}{C_{adim}}$$

where $C_e(t)$ is the concentration of the analyte species in the reaction fluid at the inlet of the reaction chamber;

$$t_M = \frac{V_s}{S_{ech}k_M}$$

is a time constant characteristic of mass transport processes in the reaction chamber;

$C_{s,\ max}$ is the concentration of reactive elements of the ligand species coated on the support material, which, for this equation to be applicable is to be expressed per volume of support material (as in the example);

$V_s$ is the total volume of the discrete reactive particles immersed in the reaction fluid in the reaction chamber;

$S_{ech}$ is the area of the reactive solid surface;

$k_M$ is the mass transport coefficient;

$k_a$ the intrinsic association rate constant of the assay chemical reaction;

$k_d$ the intrinsic dissociation rate constant of the assay chemical reaction.

By using the same change of variables, an expression of the mass balance of the analyte species bound to a reactive element of the ligand species coated on the support material may be written with the following terms:

$$\frac{\partial \psi^*(t)}{\partial t} = k_d\left(1 + \frac{k_a}{k_d}C_{adim}\psi^*(t)\right)^2 \frac{\psi_f(t) - \psi^*(f)}{1 + \frac{k_a}{k_d}C_{adim}\psi^*(t) + t_M k_a C_{s,max}}$$

where $$t_M = \frac{V_s}{S_{ech} k_M}$$

is a time constant characteristic of mass transport processes in the reaction chamber;

$V_s$ is the total volume of the discrete reactive particles immersed in the reaction fluid in the reaction chamber;

$S_{ech}$ is the area of the reactive solid surface;

$k_M$ is a mass transport coefficient;

$k_a$ the intrinsic association rate constant of the assay chemical reaction;

$k_d$ the intrinsic dissociation rate constant of the assay chemical reaction;

$C_{s,\ max}$ is the concentration of reactive elements of the ligand species coated on the support material, which, for this equation to be applicable is to be expressed per volume of support material (as in the example).

The two above equations, which reflect respectively the mass balance of the analyte species in the reaction fluid, and the mass balance of the analyte species bound to a reactive element of the ligand species coated on the support material, may be integrated using suitable initial and boundary conditions.

These equations may then be implemented for solving, on an electronic computer unit such as the separate electronic computer unit 82, in a suitable mathematic solving program, such as the MATLAB® software from The MathWorks, Inc., for example using an ordinary differential equation solver, such as the MATLAB® ordinary differential equation solver, with adequate initial boundary and connection conditions.

In these equations, some parameters are known.

$V_s$, the total volume of the discrete reactive particles immersed in the reaction fluid in the reaction chamber (m³) may be determined by weighing the particles introduced in the reaction chamber, the density of the support material of which these particles are made being known.

$V_f$, the volume of reaction fluid in the reaction chamber (m³), is known from dimensions of the reaction chamber, so the theoretical volume of fluid can be calculated. It can also be obtained by weighing an amount of liquid filling the reaction chamber.

$t_0$, the time constant characteristic of flow:

$$t_0 = \frac{V_f}{f}$$

(s) can be determined because $V_f$ is known and so is f, the volumetric flow rate that is chosen since it is controlled by the pump.

$C_{adim}$, the reference concentration used to adimensionalize the concentrations (mol·m⁻³).

Therefore, solving the above equations and fitting the values calculated via these equations with the experiment results permits to determine the characterizing parameters which are unknown:

$k_a$, the intrinsic association rate constant (m³·mol⁻¹·s⁻¹).

$k_d$, the intrinsic dissociation rate constant (s⁻¹).

$C_{s,max}$, the concentration of reactive elements of the ligand species coated on the support material, per volume of support material (as in this example) or per area of the reactive solid surface of the support material (mol·m⁻² or mol·m⁻³).

$k_M$, the mass transport coefficient.

Thus, a key result of the method is the ability to determine the value of at least one of the characterizing parameters of a chemical assay reaction for a given set of defining features. Indeed, these parameters, and especially $k_a$, the intrinsic association rate constant, $k_d$, the intrinsic dissociation rate constant, and $C_{s,max}$, the concentration of reactive elements of the ligand species coated on the support material, per volume of support material or per area of the reactive solid surface of the support material, are key indicators which can be used for determining whether the given set of defining features define a chemical assay reaction which will be considered as useful for a production assay.

Typically, the above method can thus be used for determining the characterizing parameters, for example $k_a$, $k_d$, and $C_{s,max}$, for an assay digital calibration model. Such an assay digital calibration model can be constructed as above and can be written under the abbreviated form:

ADCM($t, Ce, k_a, k_d, C_{s,max}$, Pcal)

with t being time, Ce the input concentration of the analyte species in the reaction fluid, and Pcal a vector of parameters representative of the operating parameters applicable for the calibration experiments. This model ADCM (t, Ce, $k_a$, $k_a$, $C_{s,max}$, Pcal) can for example return calculated values of one or severable output variables of the corresponding assay chemical reaction, under that set of operating conditions corresponding to the vector Pcal.

For the detection of a given analyte, the values of the characterizing parameters can be computed for different ligand species and/or for different support materials. This computation can be done based on calibration experiments, which do not necessitate the manufacturing of production assay reactors. Based on the computed characterizing parameters, one or several most promising set of defining features may be selected.

In a preferred embodiment, the electronic computer 82 comprises a database storing the tested defining features and their associated characterizing parameters.

In a preferred embodiment, the electronic computer unit 82 carries out an automatic selection of the defining features suitable for the production assay reaction. More particularly, the electronic computer unit 82 may be configured to automatically select the defining features for which, e.g. in terms of sensitivity or specificity or in terms of sensitivity and specificity of the assay reaction are above predetermined thresholds, preferably thresholds above 90%, and more preferably thresholds above 95%. In a variation, the electronic computer unit 82 may be configured to automatically select the best defining features in terms of sensitivity or specificity or in terms of sensitivity and specificity of the assay reaction.

Once a most promising set of defining features has been selected, it is possible to manufacture a production assay reactor having a solid surface made of the given support material, and to coat the solid surface made of the given support material of that production assay reactor with the given ligand species.

Therefore, in summary, a method for manufacturing a production assay reactor for use in a production assay involving a production assay chemical reaction may comprise the main steps which are exemplified in FIG. 8.

One of the initial steps of the method can be the step 100 of defining a prospective assay reaction by selecting a given set of defining features defining that assay. These defining features would typically include given analyte species, a given support material and a given ligand species, with the possible addition of other defining features as mentioned above.

Such a method includes the step 120 of providing a calibration tool 26 comprising a reaction chamber 28. Preferably, the reaction chamber is a stirred-tank reactor such as the one described above in relation to FIGS. 4 to 6. The calibration tool may be part of an experimental set-up as described above in relation to FIG. 3.

For the selected given set of defining features, the method involves the method of measuring characterizing parameters of the assay chemical reaction between the given analyte species contained in a reaction fluid and the given ligand species on a reactive solid surface made of the given support coated with the given ligand species.

Said method of measuring may advantageously comprise a step 140 of manufacturing discrete particles including discrete reactive particles having a reactive solid surface made of the given support material on which a population of the given ligand species is coated and providing said discrete particles in the reaction chamber.

The method of measuring may also comprise the step 160 of performing a series of calibration experiments:
- in which a reaction fluid, having a known input concentration of the given analyte species, is injected in the reaction chamber,
- in which calibration experiment results include, for a given calibration experiment, several measurements of at least one output variable at different successive measurement times during said given calibration experiment,
- and where, to obtain a series of calibration experiment results, different calibration experiments in a series are performed under different sets of calibration values of at least one operating parameter, the at least one operating parameter being selected in the list including the reaction fluid flow rate through the calibration tool, the input concentration of the given analyte species in the reaction fluid, the total area of the reactive solid surface of the support material in the reaction chamber.

The method of measuring may also involve the step 180 of, for the given set of defining features, computing by fitting in an electronic computer unit the values of characterizing parameters of an assay digital calibration model representative of the kinetics of the assay chemical reaction in the calibration tool, based on the series of calibration experiment results, where the values of the characterizing parameters have a dependency on the given set of defining features used for the calibration experiments.

Based on those measurements of the characterizing parameter, the method may typically involve the assessment 200 of whether or not the assay reaction defined by the defining features is suitable as a production assay. The step of assessment may involve assessing the assay's sensitivity, specificity and/or time-to-result. Typically it may involve assessing whether the sensitivity or specificity or time-to-result reach or exceed predetermined thresholds. For example, it may be required that sensitivity and/or specificity reach or exceed 90%, or more preferably reach or exceed 95%. It may of course involve other assessments, including assessments relating to cost, feasibility and/or practicality.

For example, the step of assessment may involve the use of an assay digital production model for the given set of defining features, wherein the assay digital production model incorporates, as terms of the model, the values of the characterizing parameters which have been determined for the same defining features but using an assay digital calibration model and corresponding calibration results, as described above. Typically, the assay digital production model may be used for computing estimated values of one or several output variables for a contemplated assay. Based on these estimated values for the output variables, it becomes possible to predict if the contemplated assay is suitable as a production assay.

Typically, the same characterizing parameters, for example $k_a$, $k_d$, and $C_{s,max}$, can thus be used in an assay digital production model which could be written under the abbreviated form:

$$ADPM(t, Ce, k_a, k_d, C_{s,max}, Pprod)$$

with t being time, Ce the concentration of the analyte species in the reaction fluid, and Pprod a vector of parameters representative of the operating parameters applicable for the production assay. Such model ADPM (t, Ce, $k_a$, $k_d$, $C_{s,max}$, Pprod) can for example return the values of one or severable output variables of the corresponding assay chemical reaction, under that set of operating parameters corresponding to the vector Pprod, applicable for the production assay. An assay digital production model can be constructed according to a method similar to that which was described above for constructing an assay digital calibration model, taking however into consideration the possible differences deriving from the operational parameters being different, which includes the possible differences in the setup used. Reference can be made also to methods known in the art for constructing digital models, including as described in documents cited in the preamble of this specification.

In some cases, both an assay digital production model and an assay digital calibration model for the same given set of defining features can be written as a common assay digital model, for example under the form:

$$ADM(t, Ce, k_a, k_d, C_{s,max}, Pcal, Pprod)$$

According to another possible method, the step of assessment 200 can be performed by comparing the value(s) of one or several of the characterizing parameters, or values derived therefrom, to reference values, or reference ranges of values. The reference values, or reference ranges of values can have been determined empirically, by experimentation, and/or by calculation. The reference values, or reference ranges of values can be known to correspond to suitable sets of defining features.

The step of assessment 200 can include further experimental testing, with the advantage that such further experimental testing would be limited to only a part of the candidate sets of defining features, those for which the characterizing parameters have been determined as suitable or potentially suitable by at least one of the methods above.

As long as the computed values of the characterizing parameters are not suitable for the production assay reaction, meaning that the assay reaction they define is not suitable as a production assay, the method would iteratively involve modifying 210 the set of given defining features and carrying out steps 140 to 200 with the modified set of defining features. This iteration could be stopped at the first occurrence of a suitable assay reaction. Alternatively, this iteration could be repeated as long as a range of sets of defining features is not fully scanned, in view of an exhaustive of a number of sets of defining features. Typically, different sets of defining features could be thus investigated. In such a case, the different sets which have been investigated may be compared as regards to their suitability. They may be ranked.

In one example, a group of different sets of defining features could be investigated where the sets of features differ only by the value of only one of the defining features being different from one set of features to another in that group of sets of features. For example, different sets of defining features could be investigated where the sets of features differ only by the analyte species being different from one set to another, or only by the ligand species being different from one set to another, or only by the support material being different from one set to another, or only by the temperature being different from one set to another.

Advantageously, the method may involve storing 220, for example in an electronic memory, as suitable defining features including at least a suitable support material and a corresponding suitable ligand species, at least one set of said given defining features for which the computed values of the characterizing parameters are suitable for the production assay.

As a result, the method would then allow the step 240 of manufacturing the production assay reactor according to the suitable defining features, including manufacturing the production assay reactor with a support surface made of the suitable support material and coating said support surface with the corresponding suitable ligand species.

Typically, such a production assay reactor is to be mass-produced. If the selected support material is a synthetic polymer material, the manufacture of production assay reactors may involve the molding, for example by injection molding with a press, where the press may implement a multi-cavity mold, of one or several reactor components. The coating of the production assay reactors with the selected may then be performed on the molded reactor components.

The production assay reactors may be hollow, open or closed.

The ligand species are coated, for example by adsorption, on the reactor component, on its internal surface. Usually, the coating of the ligand species to the support surface of the production assay reactors is done by bringing into contact a solution containing the ligand species with the support surface of the reactor component. This may be performed statically, for a long period of time, for example more than 6 hours, and in some examples between 8 and 16 hours, typically 12 hours. Several examples of a coating process are described in patent document FR2417094. Another method of applying ligand species on a support surface of an assay reactor comprises bringing together a sensitization solution containing the ligand species, then optionally causing a stirring for example by means of a vibration stirring plate or orbital motion, for several hours, on average 4 hours.

Document WO2018234682 discloses a further method which may be used in a method according to the present invention, particularly applicable to manufacture production assay reactors in the form of a tube or a cone having a circular or ellipsoidal opening at each end. Such method comprises the following steps: (i) connecting the reactor component to a suction/discharge device, (ii) sucking, into the reactor component, via one of its ends, a solution comprising said at least one ligand species, referred to as the sensitizing solution, contained in a receptacle R1, (iii) continuing the contact between the sensitization solution and the inner surface of the reactor component for a time between 0 seconds and 11 minutes, (iv) discharging the sensitization solution into a receptacle, which is or is not said receptacle R1, the steps (ii) to (iv) forming a cycle that can be repeated at least once, over a total duration of at least 1 minute and not more than 2 hours 30 minutes.

It is then possible to perform, in such a production assay reactor, an assay involving the given analyte species contained in a reaction fluid.

A production assay reactor manufactured according to the invention may be used to perform production assays with an automated apparatus for immunological assays. As an example of automated apparatus for immunological assays, mention may be made in particular of the VIDAS® apparatus, marketed by one of the applicants, bioMérieux, which is a multiparametric automation for immunoanalysis. This apparatus is composed of an analytical module that automatically performs all the steps of the analysis until the results are rendered. The principle of the VIDAS® test is based on the use of a cone as described in relation to FIG. 1 as a production assay reactor. The cone is thus coated with the ligand species on its interior wall surface. The cone is for single use and allows sample collection. During the assay, it allows the suction/discharge stages intended to successively bring into contact the multiple reagents involved in the assay. A multi-well strip contains all ready-to-use reagents, distributed in the various wells of the strip. One of the wells of the strip allows the deposit of the test sample that one wishes to analyze. At each stage of the immunoanalysis assay, the cone sucks and pushes several times the different reagents contained in the wells of the strip until the final reading step. The last well of the strip constitutes the reading cell in which the intensity of the reaction is measured in fluorescence. Document WO2012017175 describes further improvements to such a process.

FIGS. 7A to 7D have already been discussed above as representing plots of a series of calibration experiments results. Each of these figures represents the calibration experiment results for one calibration experiment in a series, where each measurement is represented by a dot on the figure. However, on the figures is also represented a line. This line represents the simulated output values which have been calculated using the assay digital calibration model, when implementing the characterizing parameters for the given set of defining features, which have been fitted by computation based on a series of calibration experiments, according to the method described above. Because the line closely matches the set of dots, in each graph, it is visible that the assay digital calibration model shows good accuracy, and that the assay digital calibration model, using the characterizing parameters for the given set of defining features, which have been fitted by computation based on a series of calibration experiments performed with same set of defining features, can thus be used for predicting the kinetics of the assay chemical reaction defined by this set of defining features.

In FIGS. 7A to 7D the line and the dots in a same graph represent respectively calculated (or otherwise said simulated) and measured values of the output variable, for a same set of values of operating parameters. This set of values of the operating parameters, which has been used for a calibration experiment in the computation of the characterizing parameters, can be called set of calibration values of the operating parameters.

However, it can be shown that the characterizing parameters, although they may vary depending on the defining features, are in most cases independent from the values of the operating parameters, at least when these parameters remain within a certain range.

Thus, with the digital model, using the characterizing parameters for the given set of defining features, where the characterizing parameters have been fitted by computation based on a series of calibration experiments performed with same set of defining features, can thus be used for predicting the kinetics of the assay chemical reaction defined by this set of defining features, but under a different set of values of the operational conditions.

Thus, it becomes possible to predict the kinetics of a given assay chemical reaction, for a set of contemplated values of the at least one operating parameter, wherein the set of contemplated values of the at least one operating parameter is different from any set of calibration values of the at least one operating parameter.

For example, it is possible to use the values of the characterizing parameters for the given set of defining features which have been determined with the above method using the assay digital calibration model, in an assay digital production model for the same defining features but with different operating parameters.

Indeed, it is possible to calculate at least one output variable using the assay digital production model with the values of the characterizing parameters for the given set of defining features, even though these values of the characterizing parameters have been determined with the assay digital calibration model, under the condition that the defining features are the same.

The invention claimed is:

1. A method for measuring a plurality of values of one or more characterizing parameters of a kinetics of an assay chemical reaction between a ligand species coated on a solid surface of a support material to form a reactive solid surface, and an analyte species contained in a reaction fluid, wherein the analyte species is able to bind with the ligand species according to the assay chemical reaction when the reaction fluid containing the analyte species is brought into contact with the support material on which the ligand species is coated; wherein the method comprises:
providing a calibration tool comprising a reaction chamber;
for a set of defining features, comprising the support material, the ligand species, and the analyte species, introducing, into the reaction chamber, discrete particles including discrete reactive
particles having a reactive solid surface made of the support material on which a population of the ligand species is coated,
the method further comprises, for the set of defining features performing a series of calibration experiments, each including:
injecting a reaction fluid, having a known input concentration of the analyte species into the reaction chamber,
measuring at least one output variable at different successive measurement times during each calibration experiment of the series,
obtaining a series of calibration experiment results by conducting the series of calibration experiments under different sets of calibration values for at least one operating parameter, selected from the following list: a reaction fluid flow rate through the calibration tool, an input concentration of the analyte species in the reaction fluid, a total area of the reactive solid surface of the support material in the reaction chamber;
providing, in an electronic computer unit, a digital calibration model representative of a kinetics of the assay chemical reaction in the calibration tool, wherein the digital calibration model comprises one or more values of the one or more characterizing parameters depending on the set of defining features used in the series of calibration experiments;
computing and fitting the values of the one or more characterizing parameters for the set of defining features, from the series of calibration experiment results, wherein the reaction chamber is a stirred-tank reactor.

2. The method according to claim 1, wherein the reaction chamber is further in the form of a flow-through chamber, comprising a fluid inlet and a fluid outlet, and wherein, each calibration experiment of the series, comprises:
injecting the reaction fluid, with a known input concentration of the analyte species, into fluid inlet of the flow-through chamber of the calibration tool;
measuring at least one output variable at the fluid output of the calibration tool.

3. The method according to claim 2, wherein the reaction chamber is a continuous-flow stirred-tank reactor.

4. The method according to claim 3, wherein the continuous-flow stirred-tank reactor comprises an internal volume comprising:
an input compartment fluidly connected the fluid inlet;
an output compartment fluidly connected the fluid outlet;
a reaction compartment located between and fluidly connected to the input compartment and the output compartment, for receiving discrete reactive particles,
wherein the reaction chamber configured to allow the reaction fluid to flow from the input compartment to the output compartment through the reaction compartment.

5. The method according to claim 4, wherein the reaction compartment is an annular compartment surrounding the input compartment, and the output compartment is an annular compartment surrounding the reaction compartment.

6. The method according to claim 4, wherein the reaction compartment is separated from both the input compartment, and the output compartment, by respective sieves which are configured to retain the discrete reactive particles while allowing the reaction fluid to through-flow.

7. The method according to claim 1, wherein each calibration experiment of the series of calibration experiments comprises injecting a reaction fluid into the reaction chamber with a known non-null input concentration of the analyte species.

8. The method according to claim 1, wherein at least one calibration experiment of the series of calibration experiments comprises injecting a reaction fluid into the reaction chamber with a known non-null input concentration of the analyte species.

9. The method according to claim 1, wherein at least one calibration experiment of the series of calibration experiments comprises injecting a reaction fluid into the reaction chamber having a known non-null input concentration of the analyte species, and at least one calibration experiment of the series of calibration experiments comprises: injecting a reaction fluid into the reaction chamber having a known null input concentration of the analyte species.

10. The method according to claim 1, wherein the method comprises predicting the kinetics of the assay chemical reaction in a production assay where a reaction fluid containing the analyte species is to be presented in the production assay reactor having a solid surface made of the support material on which ligand species are coated, the predicting using, an assay digital production model representative of the kinetics of the assay chemical reaction in a production assay reactor based on the plurality of values of the one or more characterizing parameters.

11. The method according to claim 10, wherein a set of respective values of the at least one operating parameters is different from the sets of calibration values of the at least one operating parameter implemented in the series of calibration experiments.

12. The method according to claim 1, wherein the set of defining features includes a temperature in the reaction chamber.

13. The method according to claim 1, wherein at least one value of the one or more characterizing parameters, which is computed and fitted, is a function of a concentration of reactive elements of the ligand species coated on the support material, per volume of the support material or per area of the reactive solid surface of the support material.

14. The method according to claim 10, wherein the concentration of reactive elements of the ligand species coated on the support material, per volume of support material or per area of the reactive surface of the support material, is approximated as a maximum concentration of analyte species bound to a ligand element coated on the support material, per volume of support material or per area of the reactive solid surface of the support material.

15. The method according to claim 10, wherein at least one value of the one or more characterizing parameters of the assay digital calibration model, which is computed and fitted, is based on the series of calibration experiment results, is an intrinsic association rate constant of the assay chemical reaction.

\* \* \* \* \*